United States Patent
Amb et al.

(10) Patent No.: US 10,551,566 B2
(45) Date of Patent: Feb. 4, 2020

(54) METHOD OF PREPARING AN OPTICAL CONNECTOR AND OPTICAL DEVICES COMPRISING THE OPTICAL CONNECTOR PREPARED THEREBY

(71) Applicant: Dow Corning Corporation, Midland, MI (US)

(72) Inventors: Chad Amb, Hudson, WI (US); Dale L. Jarzabkowski, Saginaw, MI (US); Brandon W Swatowski, Sanford, MI (US); William K Weidner, Bay City, MI (US)

(73) Assignee: Dow Silicones Corporation, Midland, MI (US)

( * ) Notice: Subject to any disclaimer, the term of this patent is extended or adjusted under 35 U.S.C. 154(b) by 437 days.

(21) Appl. No.: 15/113,935

(22) PCT Filed: Jan. 22, 2015

(86) PCT No.: PCT/US2015/012364
§ 371 (c)(1),
(2) Date: Jul. 25, 2016

(87) PCT Pub. No.: WO2015/126561
PCT Pub. Date: Aug. 27, 2015

(65) Prior Publication Data
US 2016/0349455 A1    Dec. 1, 2016

Related U.S. Application Data

(60) Provisional application No. 61/943,029, filed on Feb. 21, 2014.

(51) Int. Cl.
*G02B 6/26* (2006.01)
*B29D 11/00* (2006.01)
(Continued)

(52) U.S. Cl.
CPC .......... *G02B 6/264* (2013.01); *B29D 11/0075* (2013.01); *G02B 1/04* (2013.01);
(Continued)

(58) Field of Classification Search
CPC ...... G02B 6/264; G02B 6/382; G02B 6/3885; G02B 6/4212; G02B 6/02033; G02B 6/262; G02B 1/045; G02B 1/04; B29D 11/0075
See application file for complete search history.

(56) References Cited

U.S. PATENT DOCUMENTS 4,883,743 A    11/1989   Booth et al.
5,835,646 A    11/1998   Yoshimura et al.
(Continued)

FOREIGN PATENT DOCUMENTS

JP    2003131063       5/2003
JP    2006106472 A     4/2006
(Continued)

OTHER PUBLICATIONS

Search report from corresponding Taiwan 104104024 application, dated Aug. 15, 2018.
(Continued)

*Primary Examiner* — Mathieu D Vargot

(57) ABSTRACT

A method of preparing an optical connector located within a gap between a first optical assembly and a second optical assembly is provided. The optical connector includes a contrast layer having at least one cured bridge portion and at least one uncured portion formed from a first composition having a first refractive index ($RI^1$). The method comprises applying a second composition having a second refractive index ($RI^2$) on the contrast layer to form a second layer and mixing at least a portion of the second layer with the at least one uncured portion of the contrast layer to form at least one (Continued)

intermixed portion having a third refractive index ($RI^3$), wherein $RI^1 > RI^3 > RI^2$, and then curing the intermixed portion and optional second layer such that each one of the at least one cured bridge portions is surrounded by an intermixed portion and optional second layer.

14 Claims, 9 Drawing Sheets

(51) Int. Cl.

| | | |
|---|---|---|
| G02B 6/42 | (2006.01) | |
| G02B 1/04 | (2006.01) | |
| G02B 6/38 | (2006.01) | |
| G02B 6/02 | (2006.01) | |
| G02B 6/255 | (2006.01) | |
| G02B 6/30 | (2006.01) | |
| B29C 35/08 | (2006.01) | |
| B29K 83/00 | (2006.01) | |

(52) U.S. Cl.
CPC ......... *G02B 1/045* (2013.01); *G02B 6/02033* (2013.01); *G02B 6/262* (2013.01); *G02B 6/382* (2013.01); *G02B 6/3885* (2013.01); *G02B 6/4212* (2013.01); *B29C 35/0805* (2013.01); *B29C 2035/0827* (2013.01); *B29K 2083/00* (2013.01); *G02B 6/255* (2013.01); *G02B 6/30* (2013.01); *G02B 6/4292* (2013.01)

(56) References Cited

U.S. PATENT DOCUMENTS

| | | | |
|---|---|---|---|
| 6,334,012 B1 * | 12/2001 | Yoon | G02B 6/4201 385/24 |
| 7,440,657 B2 | 10/2008 | Furue et al. | |
| 7,771,794 B2 | 8/2010 | Watanabe et al. | |
| 8,078,024 B2 | 12/2011 | Hirose | |
| 8,168,376 B2 | 5/2012 | Hodono | |
| 9,482,830 B2 * | 11/2016 | Bhagavatula | G02B 6/32 |
| 2005/0271336 A1 | 12/2005 | Galstian et al. | |
| 2007/0054222 A1 | 3/2007 | Gorczyca et al. | |
| 2008/0292244 A1 | 11/2008 | Kato et al. | |
| 2009/0285531 A1 | 11/2009 | Hirose | |
| 2011/0103741 A1 | 5/2011 | Shacklette | |
| 2013/0156365 A1 | 6/2013 | Barwicz et al. | |
| 2016/0077279 A1 * | 3/2016 | Amb | B29D 11/00663 428/201 |
| 2016/0102226 A1 * | 4/2016 | Alvarez | C07F 7/0812 428/447 |

FOREIGN PATENT DOCUMENTS

| | | |
|---|---|---|
| JP | 2007121503 A | 5/2007 |
| JP | 2009003337 | 1/2009 |
| JP | 2009003338 A | 1/2009 |
| JP | 2011034054 A | 2/2011 |
| WO | 2000029885 A1 | 5/2000 |
| WO | 2000055659 | 9/2000 |

OTHER PUBLICATIONS

PCT/US2015/012364 International Search Report dated Apr. 25, 2015.

Hirose et al.; Optical Component Coupling Using Self-Written Waveguides; Integrated Optics: Devices, Materials, and Technologies VIII, edited by Yakov Sidorin, Ari Tervonen, Proceedings of SPIE vol. 5355, (SPIE, Bellingham, WA, 2004) • 0277-786X/04/ $15 • doi: 10.1117/12.528846; pp. 206-214.

Search report for corresponding Japanese 2016-553384 application, dated Oct. 22, 2018.

* cited by examiner

METHOD OF PREPARING AN OPTICAL CONNECTOR AND OPTICAL DEVICES COMPRISING THE OPTICAL CONNECTOR PREPARED THEREBY

CROSS REFERENCE TO RELATED APPLICATIONS

This application is a U.S. national stage filing under 35 U.S.C. § 371 of PCT International Application No. PCT/US2015/012364 filed on Jan. 22, 2015, which claims the benefit of U.S. Provisional Patent Application No. 61/943,029 filed under 35 U.S.C. § 119 (e) on Feb. 21, 2014. PCT International Application No. PCT/US2015/012364 and U.S. Provisional Patent Application No. 61/943,029 are hereby incorporated by reference.

The present invention generally relates generally to methods for preparing optical connectors and the optical connectors prepared thereby.

Various techniques have been used to optically interconnect optical devices such as fiber optical devices and polymer waveguide devices. For example, in certain systems, precision micromolds are created to hold the optical fibers in place, and the fibers are then cleaved, glued, set and polished to create sufficient interfaces for interconnection. Similarly, polymer waveguide connection systems have been created using similar techniques such as laser ablation and precision alignment. Such systems, however, require precise alignment of the two optical systems in order to interconnect the optical fibers and polymer waveguides.

More recently, alternative methods have been shown to create optical connection systems (i.e., optical connectors) that do not require precision alignment of the optical devices. For example, the recent use of self written polymerization of polymer bridges creates polymer bridges between optical devices that do not require precision alignment. However, the self written polymer bridges are of a single cured polymeric material having a single refractive index. Without contrast in the refractive index of such materials, the propagation of electromagnetic radiation (i.e., one or more electromagnetic waves) through each of the self written polymer bridge is inefficient, and thus a separate cladding material having a lower refractive index than the self written polymer bridge may need to be introduced around the self written polymer bridge to increase the efficiency of electromagnetic wave propagation. The introduction of a cladding material to increase the efficiency of electromagnetic wave propagation adds additional manufacturing time and costs to the process of making the optical connection devices.

The present invention provides easier alignment of connecting optical devices, and a simple manufacturing technique, while also addressing the efficiency of electromagnetic wave propagation through optical interconnection systems.

SUMMARY OF THE INVENTION

The present invention provides a method of preparing an optical connector for use in connecting a respective one of at least one optical element of a first optical assembly to a corresponding one of at least one optical element of a second optical assembly, wherein one or more electromagnetic waves may be guided between the respective one of the at least one optical element of the first optical assembly and the corresponding one of at least one optical element of the second optical assembly.

The optical connector is located within a gap between the first optical assembly and the second optical assembly and includes a contrast layer having at least one cured bridge portion and at least one uncured portion, wherein each one of the at least one cured bridge portions extends continuously from a terminal end of one of the at least one optical element of the first optical assembly to a corresponding terminal end of a respective one of the at least one optical element of the second optical assembly. In addition, the contrast layer is formed from a first composition having a first refractive index ($RI^1$).

The method of the present invention comprises applying a second composition having a second refractive index ($RI^2$) on the contrast layer to form a second layer and mixing at least a portion of the second layer with the at least one uncured portion of the contrast layer to form at least one intermixed portion having a third refractive index ($RI^3$) in the contrast layer. In this method, each one of the at least one cured bridge portions is at least partially surrounded by one of the at least one intermixed portions between the terminal end of one of the at least one optical element of the first optical assembly and the corresponding terminal end of the respective one of the at least one optical element of the second optical assembly.

The method further comprises applying a second curing condition to cure the at least one intermixed portion.

In this method, the first and second composition and the at least one intermixed portion are different from one another. In addition, the refractive indexes of the first and second composition and the at least one intermixed portion are different from one another and wherein $RI^1 > RI^3 > RI^2$ as measured at a same wavelength and temperature.

The present invention is also directed to optical devices comprising the prepared optical connectors of the present invention.

The benefits of preparing optical connectors in accordance with the method of the present invention, and associated optical devices including such prepared optical connectors in accordance with the present invention, come in many forms. Precision alignment requirements for optical connectors will be lessened as will system misalignment tolerancing due to the fact that the interface of the cured bridge portion will conform in size and shape to the size and shape of the respective terminal ends of the optical element to which it is aligned. In addition, polishing will likely not be required because the smooth, nonscattering surfaces of one of the optical elements are templated or molded to the cured bridge portion, thus leaving a smooth, nonscattering surface upon disconnection. Further, the contrast between the higher refractive index cured bridge portions and the lower refractive index cured intermixed layer allows electromagnetic radiation to be guided along the length of the cured bridge portions with minimal losses to the surrounding cured intermixed layer. Also, the manufacturing process for forming the optical connectors is simple and reproducible for making optical connectors for coupling a wide variety of optical devices.

BRIEF DESCRIPTION OF THE DRAWINGS

Other advantages and aspects of this invention may be described in the following detailed description when considered in connection with the accompanying drawings wherein.

DETAILED DESCRIPTION OF THE INVENTION

The present invention provides a method of preparing an optical connector for use in connecting a respective one of at least one optical element of a first optical assembly to a corresponding one of at least one optical element of a second optical assembly to form an optical device. The present invention also provides a method for forming a second optical device from the first optical device including the prepared optical connector.

The method and optical connector of the invention are applicable for use in both passive-system elements and active-system elements. The following are examples of such passive-system elements and active-system elements: non-branched type optical waveguides, wave division multiplexers [WDM], branched optical waveguide, optical adhesives or similar passive light-transmitting elements, optical waveguide switches, optical attenuators, and optical amplifiers or similar active light-transmitting elements. Additional examples of suitable articles and applications in which the method and article may be utilized include volumetric phase gratings, Bragg gratings, Mach Zhender interferometers, lenses, amplifiers, cavities for lasers, acusto-optic devices, modulators, and dielectric mirrors.

Figure 1:
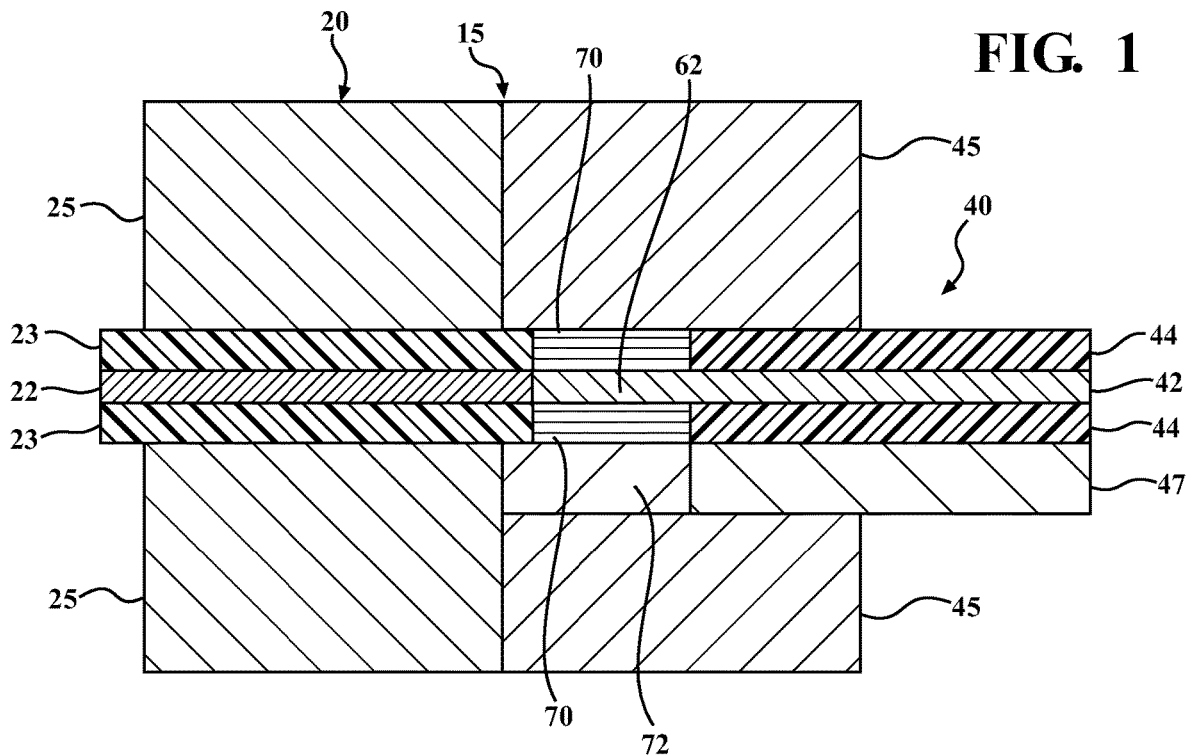
FIG. 1 illustrates a perspective view of an optical device including an optical connector in accordance with one embodiment of the present invention.
Figure 2:
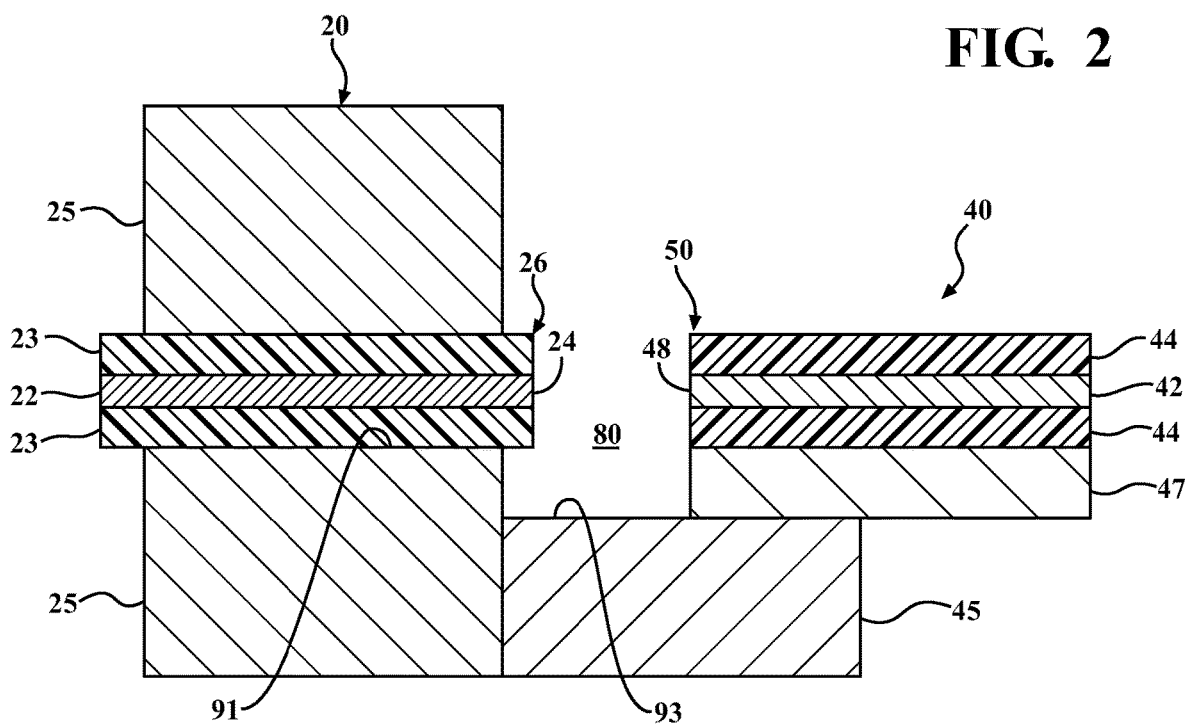
FIGS. 2-6 illustrate perspective views at different stages of a method for forming an optical connector and an associated optical device of FIG. 1 in accordance with one embodiment of the present invention.

Referring to FIG. 1, the optical device 15 formed in accordance with the method of the present invention includes a first optical assembly 20 having at least one optical element 22 (shown as one optical element 22 in FIG. 1) positioned within a cladding 23, which is positioned within a housing 25. As best shown in FIG. 2, each of the at least one optical elements 22 includes a terminal end 24 terminating at a first optical interface 26.

Again in FIG. 1, the optical device 15 includes a second optical assembly 40 having at least one optical element 42 (shown as one optical element 42 in FIG. 1) positioned within a cladding 44, which is positioned within a housing 45. As best shown in FIG. 2, each of the at least one optical elements 42 includes a terminal end 48 terminating at a second optical interface 50. Preferably, the housing 25 of the first optical assembly 20 is coupled to, or otherwise fastened to or secured to, the housing 45 of the second optical assembly 40.

In certain embodiments, as also shown in FIG. 1, the second optical assembly 40 also includes a substrate 47 that is positioned within the housing 45.

The term "optical element", as in optical element 22 or optical element 42 in FIG. 1, refers to any device or material that is capable of guiding one or more electromagnetic waves (such as, for example, one or more light waves in the ultraviolet light spectrum or one or more light waves in the visible light spectrum) along its respective length. Suitable examples of optical elements that may comprise the at least one optical element 22 and/or the at least one optical element 42 include, but are not limited to, optical fibers, polymer waveguides, lenses, transmitting modules, receiving modules, transceivers (modules including both transmitting and receiving modules).

Corresponding optical assemblies, such as the first or second optical assembly 20, 40, in FIG. 1 that include such optical elements 22 or 42 may therefore come in many forms, including many commercially available forms. Suitable commercially available optical assemblies including optical fibers as optical elements 22 or 42, for example, that may comprises the optical assembly 20 or 40 include, but are not limited, to optical connectors such as Avio, ADT-UNI, DMI, E-2000 (AKA LSH), EC, F07, F-3000, FC, Fibergate, FSMA, LC, ELIO, LX-5, MIC, MPO/MTP, MT, MT-RJ, MU, Opti-Jack, SC, SMA 905, SMA 906, SMC, ST/BFOC, TOSLINK, VF-45, 1053 HDTV, and V-PIN.

Figure 10:
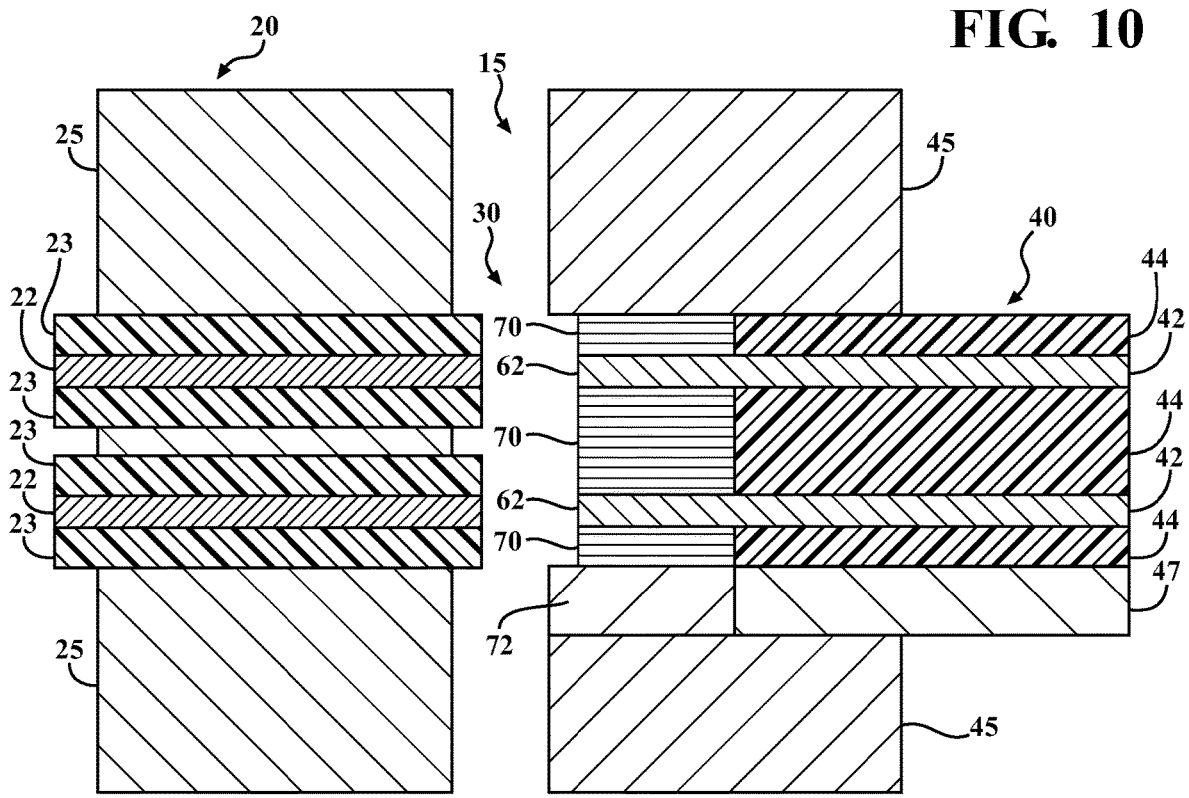
FIG. 10 illustrates a perspective view of an optical device including an optical connector having multiple cured bridge portions in accordance with another embodiment of the present invention.

While one optical element 22 and one optical element 42 are shown in many of the Figures, it is appreciated that more than one optical element 22 may be included within the first optical assembly 20 and more than one optical element 42 may be included in the second optical assembly 40, such as shown in FIG. 10. Where more than one optical element 22 or 42 is utilized, such optical elements 22 or 42 may be all of the same type (i.e., one non-limiting example is wherein all of the at least one optical elements 22 may be optical fibers) or may be of different types (i.e., one non-limiting example is wherein one optical element 22 is an optical fiber and another optical element 22 is a polymer waveguide).

Figure 11:
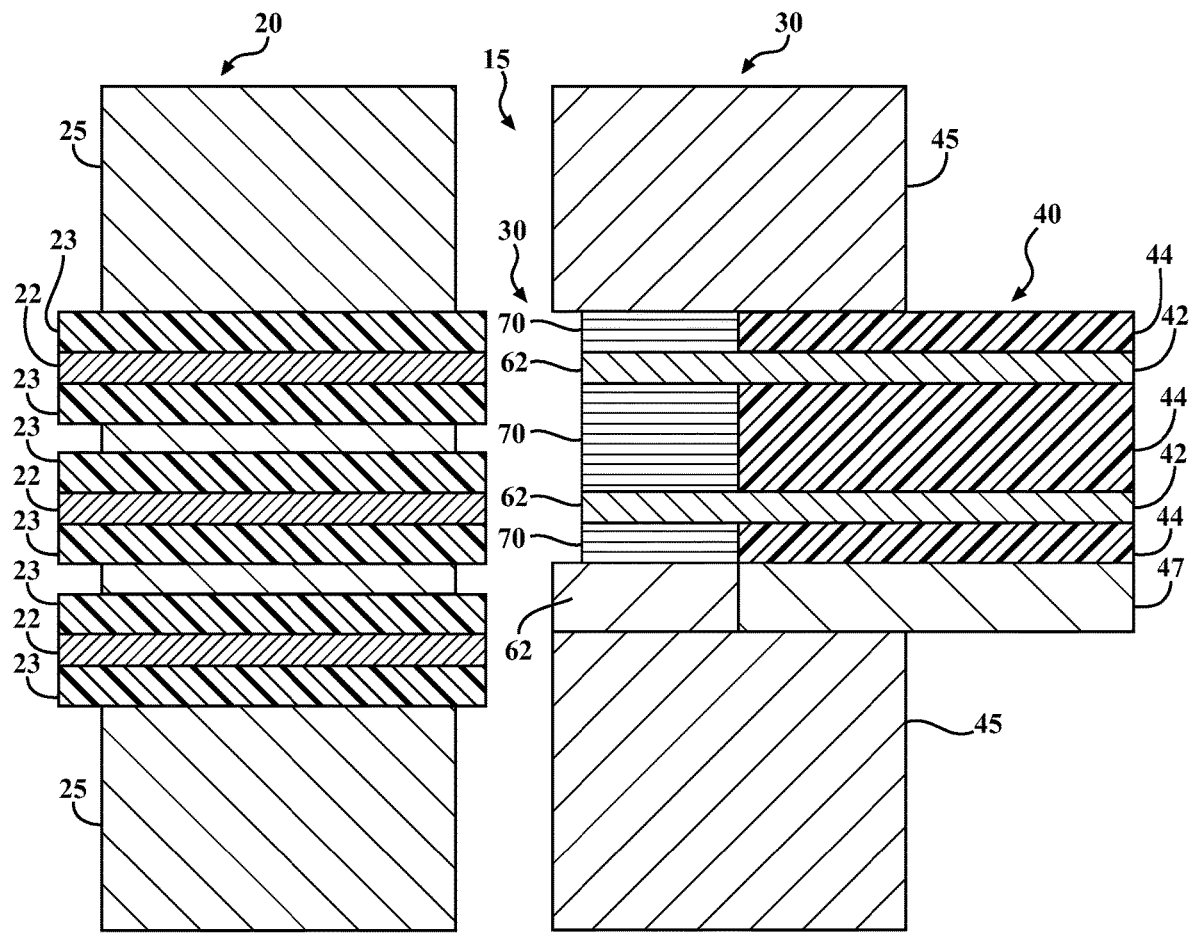
FIG. 11 illustrates a perspective view of an optical device including an optical connector having multiple cured bridge portions in accordance with yet another embodiment of the present invention.

In certain embodiments, the number of optical elements 22 in the first optical assembly 20 corresponds to the number of optical elements 42 in the second optical assembly 40. However, in other arrangements, the number of optical elements 22 in the first optical assembly 20 may be different than the number of optical elements 42 in the second optical assembly 40, but further includes wherein at least one of the optical elements 22 is coupled to a corresponding one of the optical elements 42 through a cured bridge portion 62, such as shown in FIG. 11 and as described further below.

In certain embodiments, the optical element 22 is the same as the optical element 42, while in other embodiments the optical element 22 is different from the optical element 42. Thus, for example, wherein there is only one optical element 22 and one optical element 42, both the optical element 22 and the optical element 42 may be an optical fiber, or alternatively the optical element 22 may be an optical fiber while the optical element 42 may be a polymer waveguide, a lens, a transmitting module, a receiving module, or a transceiver. Similarly, wherein there is only one optical element 22 and one optical element 42, the optical element 42 may be an optical fiber, and the optical element 22 may be a polymer waveguide, a lens, a transmitting module, a receiving module, or a transceiver. Similarly, wherein the number of optical elements 22 and optical elements 42 is two or more, each of the at least two optical elements 22 or 42 may be the same or different, and each of the at least two optical elements 22 may be the same or different than the respective at least two optical elements 42.

Still further, in certain embodiments wherein the at least one optical element 22 includes optical fibers, the number of optical fibers may vary from 1 to 144 optical fibers or more, such as from 1 to 72 optical fibers.

In embodiments including more than optical element 22 or more than one optical element 42, it should also be appreciated that the relative size and shape of the one or more optical elements 22 or 42 may be the same or different in both length and cross-section shape. Further, the size and shape of such optical elements 22 or 42 are not limited to the size and shape illustrated in the Figures. Thus, for example, the optical element 22 may be an optical fiber having a cylindrical shape and a substantially round cross-section, while the optical element 42 may be a polymer waveguide that is rectangular in cross-section.

Figure 12A:
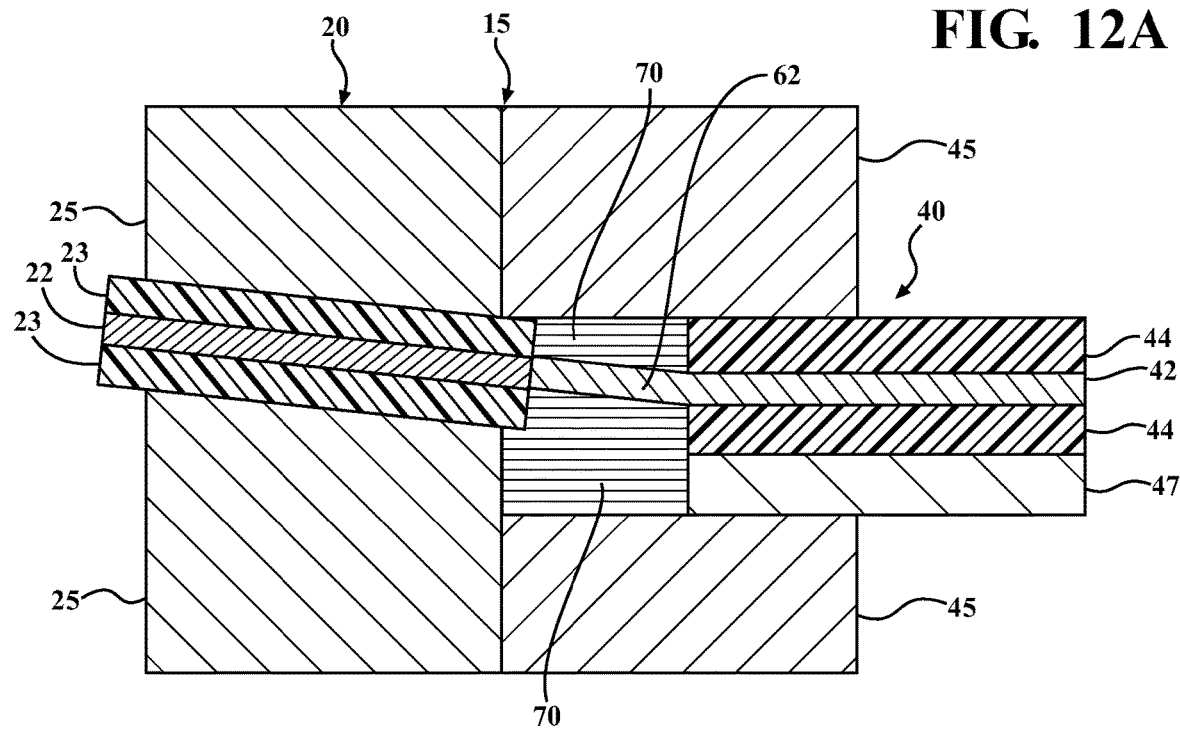
FIG. 12A illustrates a perspective view of an optical device including an angled first optical element and an angled optical connector in accordance with another embodiment of the present invention.

While the optical element 22 and 42 are generally shown as being straight along their respective length and extending perpendicular to their respective optical interfaces 26 and 50, the configuration of the optical elements 22 and 42 is not limited to the arrangement as shown in FIG. 1. For example, one or more of the at least one optical elements 22 or 42 may extend towards their respective optical interface 26 or 50 at an angle other than perpendicular to the respective optical interface 26 or 50, such as shown, for example, in FIG. 12A (with the cured bridge portion 62 also angled to connect the angled optical element 22 to the optical element 42). While the angle of the first optical element 22 and the bridge portion 62 is generally shown as extending downward (from left to right) at a slight angle relative to horizontal as in FIG. 12A, the angle may be slightly upward in other embodiments, or the angle may be greater relative to horizontal in a downward or upward direction (as shown in the Figures from left to right), and still fall within the present invention.

Figure 12B:
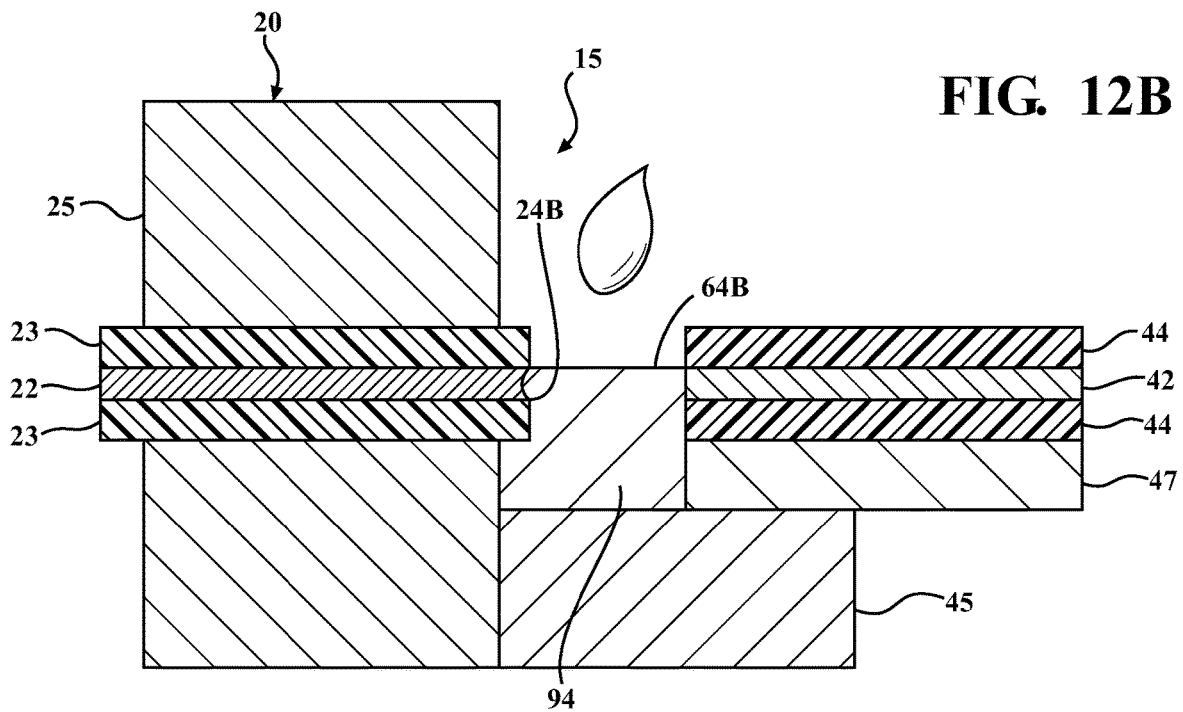
FIG. 12B illustrates a perspective view of an optical device with a first optical element having a curved terminal end in accordance with another embodiment of the present invention

While the respective terminal end 24 or 48 of the optical elements 22 or 42 are generally flat and vertical as shown in FIGS. 1-11, in certain embodiments, one or both of the terminal ends 24 or 48 may take on any variety of shapes. For example, as shown for example in FIG. 12B, the terminal end 248 of the first optical element 22 may be curved, and the corresponding first terminal end 64B shaped to correspond to the curved terminal end 24B. While not shown, the terminal end 48 of the second optical element 42 (and the corresponding terminal end 68 of the bridge portion 62) may also be curved (or may be flat as shown in FIG. 12B). The relative amount of curvature of the curved terminal end 24B as shown in FIG. 12B may be as illustrated, or may be slightly deeper or shallower than illustrated in FIG. 12B and still fall within the present invention. Still further, one or more of the optical elements 22 or 42 may be both angled and have curved or other shaped terminal end 24 or 48 and fall within the present invention.

Referring back to FIG. 1, the optical device 15 also includes an optical connector 30. The optical connector 30 includes at least one bridge portion 62, with each bridge portion 62 having a first terminal end 64 that is coupled to the terminal end 24 of the optical element 22 and having a second terminal end 66 that is coupled to a terminal end 48 of the corresponding one of the optical elements 42. Each bridge portion 62 guides one or more electromagnetic waves between the respective one of the at least one optical element 22 of the first optical assembly 20 and the corresponding one of at least one optical element 42 of the second optical assembly 40 when the optical connector 30 is coupled to both the first optical assembly 20 and the second optical assembly 40.

The optical connector 30 also includes at least one intermixed portion 70 that partially surrounds the length of each of the respective bridge portions 62 from the respective first terminal end 64 to the second terminal end 66 of the bridge portion 62 (i.e., from the terminal end 24 of the optical element 22 to the terminal end 48 of the corresponding optical element 44), but does not surround the first terminal end 64 and the second terminal end 66 (i.e., the intermixed portion 70 is not located nor in contact with the respective terminal ends 64, 66 of the bridge portion 62). In certain embodiments, a second portion 72 is present, and such embodiments, in addition to the intermixed portion 70, the second portion 72 may partially surround the length of one or more of the at least one bridge portions 62 such that the intermixed portion 70 and the second portion entirely surround the respective bridge portion. The term "at least partially surround the length", as used herein, defines wherein the respective composition is not disposed on and in contact with the respective bridge portion 62 along its entire outer surface between the first terminal end 64 and the second terminal end. Thus, in certain embodiments, the intermixed portion 70 may be disposed on and in contact with from 0.1 to 99.9 percent of the outer surface of the bridge portion 62 between the first terminal end 64 and the second terminal end 66 and be considered to "partially surround" respective bridge portion 62.

In embodiments wherein the second portion 72 is not present, one of the at least one intermixed portions 70 entirely surrounds the length of a respective one of the bridge portions 62 from the respective first terminal end 64 to the second terminal end 66 (i.e., surrounds greater than 99.9% of the length of the bridge portion 62 from the respective first terminal end 64 to the second terminal end 66). Collectively, the at least one intermixed portion 70 and the optional second portion 72 may alternatively be referred to herein as a cladding portion that therefore surrounds each one of the at least on bridge portions 62 from the respective first terminal end 64 to the second terminal end 66.

The bridge portion 62, as will be discussed in further detail below with respect to the associated method for forming the optical connector 30, is formed by curing a first composition having a first refractive index ($RI^1$). The first composition is a curable composition and may be selected based at least on the desired first refractive index and other factors, e.g. desired cure mechanism, as described below. The at least one intermixed portion 70, as will also be discussed further below, is formed by curing a blend of the first composition and a second composition. The optional second portion 72, as will be discussed below, is formed by curing a portion of the second composition that is not intermixed with the first composition. The second composition has a second refractive index ($RI^2$), and the at least one intermixed portion 70 prior to curing has a third refractive index ($RI^3$).

$RI^3$ is generally derived from an average of the blend of the $RI^1$ (of the first composition) and $RI^2$ (of the second composition) and $RI^1$, $RI^2$ and $RI^3$ are different from one another. In the present invention, the first and second compositions are selected such that $RI^1 > RI^2$, and refractive index $RI^3$ of the blend is therefore between the $RI^2$ and $RI^1$ (i.e., $RI^1 > RI^3 > RI^2$).

Notably, refractive index is generally a function of not only the substitution within the particular composition, but also of a cross-link density of the cured product. To this end, the refractive index of the cured bridge portion 62 is generally greater than $RI^1$, or greater than the refractive index of the first composition utilized to form the cured bridge portion 62. However, a refractive index gradient of each composition is generally maintained before and after curing. Said differently, the cured portion of the bridge portion 62 may have a refractive index $RI^{1'}$, and the cured portion of the at least one intermixed portion 70 may have a refractive index $RI^{3'}$, and the cured portion of the second portion 72 may have a refractive index of $RI^{2'}$, but $RI^{1'}$ and $RI^{2'}$ and $RI^{3'}$ are different from one another, just as $RI^1$ and $RI^2$ and $RI^3$ are different from one another.

For example, the first composition has refractive index $RI^1$, the cured bridge portion 62 formed from the first composition has refractive index $RI^{1'}$, where $RI^{1'} > RI^1$ due to the increased crosslink density in the cured bridge portion 62 as compared to the first composition. Similarly, the second composition has refractive index $RI^2$, the cured second portion 72 formed from the second composition has refractive index $RI^{2'}$, where $RI^{2'} > RI^2$ due to the increased crosslink density in the second layer as compared to the second composition. Similarly, the blend of the first composition and the second composition forming the uncured intermixed portion has refractive index $RI^2$, and the cured intermixed portion 70 has refractive index $RI^{3'}$, where $RI^{3'} > RI^3$ due to the increased crosslink density in the cured intermixed portion 70 as compared to blend of the first composition and the second composition that form the uncured intermixed portion. To this end, when $RI^1 > RI^3 > RI^2$, then $RI^{1'} > RI^{3'} > RI^{2'}$. The ratio of $RI^{1'}/RI^1$ may be the same as or different than the ratio of $RI^{2'}/RI^2$ and may be the same or different than the ratio of $RI^{3'}/RI^3$.

In certain embodiments, the first and second compositions each include a cationic polymerizable material including at least one cationic polymerizable group. Cationic polymerizable materials are typically curable upon exposure to active-energy rays via a cationic reaction mechanism. The cationic polymerizable group may be a neutral moiety. That is, the term "cationic" modifies polymerizable rather than group. The cationic polymerizable group may be located at any position(s) of the cationic polymerizable material. For example, the cationic polymerizable group may be pendent from or a substituent of the cationic polymerizable compound. The at least one cationic polymerizable group is referred to herein merely as "the cationic polymerizable group," which, although singular, encompasses embodiments in which the cationic polymerizable group includes more than one cationic polymerizable group, i.e., two or more cationic polymerizable groups. Typically, the cationic polymerizable material includes two or more cationic polymerizable groups, which are independently selected.

In certain embodiments, the cationic polymerizable group comprises a heterocyclic functional group, defined as a cyclic organic functional group including at least one heteroatom, such as S, N, O, and/or P; alternatively S, N, and/or O. For example, heterocyclic groups include, but are not limited to, lactone groups, lactam groups, cyclic ethers, and cyclic amines. Lactone groups are generally cyclic esters and may be selected from, for example, an acetolactone, a propiolactone, a butyrolactone, and a valerolactone. Lactam groups are generally cyclic amides and may be selected from, for example, a β-lactam, a γ-lactam, a δ-lactam and an Σ-lactam. Specific examples of cyclic ethers include oxirane, oxetane, tetrahydrofuran, and dioxepane (e.g. 1,3-dioxepane). Additional examples of heterocyclic functional groups include thietane and oxazoline. Notably, the heterocyclic functional groups described above may also exist as monomers. However, in the context of the cationic polymerizable group, the heterocyclic functional groups set forth above are substituents of a larger molecule and not discrete monomers. Further, these groups may be bonded or connected to the cationic polymerizable material via a divalent linking group.

In other embodiments, the cationic polymerizable group may comprise a cationic polymerizable group other than a heterocyclic functional group. For example, the cationic polymerizable group may alternatively be selected from an ethylenically unsaturated group, such as a vinyl, a vinyl ether, a divinyl ether, a vinyl ester, a diene, a tertiary vinyl, a styrene, or a styrene-derivative group.

Combinations of different heterocyclic functional groups, or combinations of cationic polymerizable groups other than heterocyclic functional groups, or combinations of heterocyclic functional groups and cationic polymerizable groups other than heterocyclic functional groups, may be included in the cationic polymerizable material.

In certain embodiments in which the cationic polymerizable material is organic, the first and/or second compositions may independently comprise an olefinic or polyolefinic material. In other embodiments, the first and/or second compositions comprise an organic epoxy-functional material, such as an epoxy resin. Specific examples of epoxy resins include bisphenol-type epoxy resins, such as bisphenol-A type, bisphenol-F type, bisphenol-AD type, bisphenol-S type, and hydrogenated bisphenol-A type epoxy resin; a naphthalene-type epoxy resin; a phenol-novolac-type epoxy resin; a biphenyl-type epoxy resin; a glycidylamine-type epoxy resin; an alicyclic-type epoxy resin; or a dicyclopentadiene-type epoxy resin. These epoxy resins can be used in combinations of two or more in each of the first and/or second compositions. Alternatively still, the first and/or second compositions may independently comprise a polyacrylic, a polyamide, a polyester, etc. or other organic polymeric material including the cationic polymerizable group. In these embodiments, the first and/or second compositions each independently comprise organic compositions. "Organic material," as used herein, is distinguished from a silicone material, with silicone materials having a backbone comprising siloxane bonds (Si—O—Si) and organic materials having a carbon-based backbone and lacking siloxane bonds.

In other embodiments, for increasing miscibility, the first and second compositions each independently comprise a silicone composition. If desired, the first composition may comprise a silicone composition and the second composition may comprise an organic composition, and vice versa. One of skill in the art can readily determine refractive index of a composition and determine miscibility between two compositions.

When the first and/or second compositions comprise silicone compositions, the first and/or second compositions comprise a silicone material. The silicone composition and the silicone material comprise organopolysiloxane macromolecules, wherein each macromolecule independently may be straight or branched. The silicone material may comprise any combination of siloxane units, i.e., the silicone material comprise any combination of $R_3SiO_{1/2}$ units, i.e., M units, $R_2SiO_{2/2}$ units, i.e., D units, $RSiO_{3/2}$ units, i.e., T units, and $SiO_{4/2}$ units, i.e., Q units, where R is typically independently selected from a substituted or unsubstituted hydrocarbyl group or cationic polymerizable group. For example, R may be aliphatic, aromatic, cyclic, alicyclic, etc. Further, R may include ethylenic unsaturation. By "substituted," it is meant that one or more hydrogen atoms of the hydrocarbyl may be replaced with atoms other than hydrogen (e.g. a halogen atom, such as chlorine, fluorine, bromine, etc.), or a carbon atom within the chain of R may be replaced with an atom other than carbon, i.e., R may include one or more heteroatoms within the chain, such as oxygen, sulfur, nitrogen, etc. R typically has from 1 to 10 carbon atoms. For example, R may have from 1 to 6 carbon atoms when aliphatic, or from 6 to 10 carbon atoms when aromatic. Substituted or unsubstituted hydrocarbyl groups containing at least 3 carbon atoms can have a branched or unbranched structure. Examples of hydrocarbyl groups represented by R include, but are not limited to, alkyl, such as methyl, ethyl, propyl, butyl, hexyl, heptyl, octyl, nonyl, decyl, and isomers of such groups; alkenyl, such as vinyl, allyl, and hexenyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl. Examples of halogen-substituted hydrocarbyl groups represented by R are exemplified by 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl. Examples of the cationic polymerizable group represented by R are set forth above.

In embodiments in which the silicone material is resinous, the silicone material may comprise a DT resin, an MT resin, an MDT resin, a DTQ resin, an MTQ resin, an MDTQ resin, a DQ resin, an MQ resin, a DTQ resin, an MTQ resin, or an MDQ resin. Combinations of different resins may be present in the silicone material. Moreover, the silicone material may comprise a resin in combination with a polymer.

In one specific embodiment, the silicone material comprises or consists of an organopolysiloxane resin. The organopolysiloxane resin may be represented by the following siloxane unit formula:

$(R^1R^2R^3SiO_{1/2})_a(R^4R^5SiO_{2/2})_b(R^6SiO_{3/2})_c(SiO_{4/2})_d,$ where $R^1$, $R^2$, $R^3$, $R^4$, $R^5$, and $R^6$ are independently selected from R, which is defined above; a+b+c+d=1; "a" on average satisfies the following condition: 0≤a<0.4; "b" on average satisfies the following condition: 0<b<1; "c" on average satisfies the following condition: 0<c<1; "d" on average satisfies the following condition; 0≤d<0.4; and "b" and "c" are bound by the following condition: 0.01≤b/c≤0.3. Subscripts a, b, c, and d designate an average mole number of each siloxane unit. Said differently, these subscripts represent an average mole % or share of each siloxane unit in one molecule of the organopolysiloxane resin. Because $R^{1-6}$ are independently selected from R, the siloxane unit formula above can be rewritten as follows:

$(R_3SiO_{1/2})_a(R^2SiO_{2/2})_b(RSiO_{3/2})_c(SiO_{4/2})_d,$ where R is independently selected and defined above, and a-d are defined above.

Typically, in one molecule of the organopolysiloxane resin, siloxane units including a cationic polymerizable group constitute 2 to 50 mole % of total siloxane units. Further, in these embodiments, at least 15 mole % of all silicon-bonded organic groups comprise univalent aromatic hydrocarbon groups with 6 to 10 carbon atoms (e.g. aryl groups).

The organopolysiloxane resin contains $(R^4R^5SiO_{2/2})$ and $(R^6SiO_{3/2})$ as indispensable units. However, the organopolysiloxane may additionally comprise structural units $(R^1R^2R^3SiO_{1/2})$ and $(SiO_{4/2})$. In other words, the epoxy-containing organopolysiloxane resin may be composed of the units shown in the following formulae:

$(R^4R^5SiO^{2/2})_b(R^6SiO_{3/2})_c;$ $(R^1R^2R^3SiO_{1/2})_a(R^4R^5SiO_{2/2})_b(R^6SiO_{3/2})_c;$ $(R^4R^5SiO_{2/2})_b(R^6SiO_{3/2})_c(SiO_{4/2})_d;$ or $((R^1R^2R^3SiO_{1/2})_a(R^4R^5SiO_{2/2})b(R^6SiO_{3/2})_c(SiO_{4/2})_d.$

If the content of the $(R^1R^2R^3SiO_{1/2})$ units is too high, the molecular weight of the organopolysiloxane resin is reduced, and the following condition takes place: 0≤a<0.4. If $(SiO_{4/2})$ units are introduced under this condition, a cured product of the organopolysiloxane resin may become undesirably hard and brittle. Therefore, in certain embodiments, the following condition is met: 0≤d<0.4; alternatively 0≤d<0.2; alternatively d=0. The mole ratio b/c of the indispensable structural units $(R^4R^5SiO_{2/2})$ and $(R^6SiO_{3/2})$ should be from 0.01 to 0.3, alternatively from 0.01 to 0.25, alternatively from 0.02 to 0.25. Because the organopolysiloxane resin contains $(R^4R^5SiO_{2/2})$ and $(R^6SiO_{3/2})$ as indispensable units, the molecular structure may vary mainly between branched, net-like and three-dimensional.

The refractive index of the first and second compositions, when the first and second compositions each comprise the organopolysiloxane resin, may be selectively modified by changing R of the respective organopolysiloxane resin. For example, when a majority of R in the organopolysiloxane resin are univalent aliphatic hydrocarbon groups, such as methyl groups, the refractive index of the organopolysiloxane resin may be less than 1.5. Alternatively, if a majority of R in the organopolysiloxane resin are univalent aromatic hydrocarbon groups, such as phenyl groups, the refractive index may be greater than 1.5. This value can be readily controlled by substitution of the organopolysiloxane resin, or by inclusion of additional components in the first and/or second compositions, as described below. As such, in certain embodiments, the first composition comprises an organopolysiloxane resin including univalent aromatic hydrocarbon groups, whereas the second composition comprises an organopolysiloxane resin including univalent aliphatic hydrocarbon groups.

In various embodiments of the organopolysiloxane resin, siloxane units having a cationic polymerizable group constitute from 2 to 70, alternatively from 10 to 40, alternatively 15 to 40, mole % of all siloxane units. If such siloxane units are present in the organopolysiloxane resin in an amount below 2 mole %, this will lead to a decrease in a degree of cross-linking during curing, which decreases hardness of the cured product formed therefrom. If, on the other hand, the content of these siloxane units exceeds 70 mole % in the organopolysiloxane resin, the cured product may have reduced visible light transmittance, low resistance to heat, and increased brittleness. Typically, the cationic polymerizable groups are not directly bonded to silicon atoms of the organopolysiloxane resin. Instead, the cationic polymerizable groups are generally bonded to silicon atoms via a bivalent linking group, such as a hydrocarbylene, heterohydrocarbylene, or organoheterylene linking group.

For example, when the cationic polymerizable groups are cyclic ether groups, e.g. epoxy groups, specific examples of cationic polymerizable groups suitable for the organopolysiloxane resin are set forth immediately below:

3-(glycidoxy) propyl group:

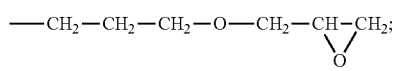

2-(glycidoxycarbonyl) propyl group:

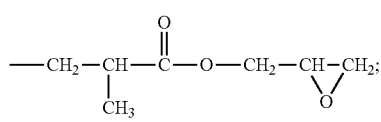

2-(3,4-epoxycyclohexyl) ethyl group:

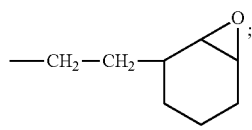

and
2-(4-methyl-3,4-epoxycyclohexyl) propyl group:

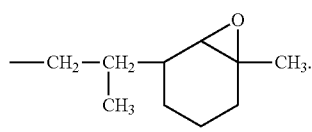

Additional examples of cyclic ether groups suitable for the cationic polymerizable group include the following: 2-glycidoxyethyl, 4-glycidoxybutyl, or similar glycidoxyalkyl groups; 3-(3,4-epoxycyclohexyl) propyl, or similar 3,4-epoxycyclohexylalkyl groups; 4-oxiranylbutyl, 8-oxiranyloctyl, or similar oxiranylalkyl groups. In these embodiments, the cationic polymerizable material may be referred to as an epoxy-functional silicone material.

Specific examples of cationic polymerizable groups other than the epoxy groups exemplified above include, but are not limited to, the following groups (with the left-most portion representing the bond connecting the particular cationic polymerizable group to the organopolysiloxane resin):

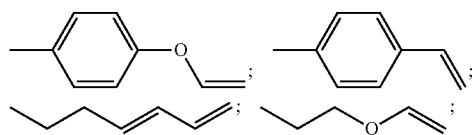

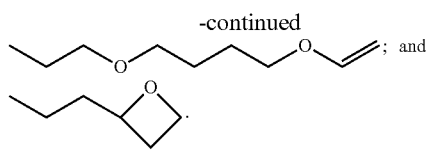

Specific examples of the organopolysiloxane resin when the cationic polymerizable groups are cyclic ether groups, e.g. epoxy groups, include organopolysiloxane resins comprising or consisting of the following sets of siloxane units: $(Me_2SiO_{2/2})$, $(PhSiO_{3/2})$, and $(E^1SiO_{3/2})$ units; $(Me_3SiO_{1/2})$, $(Me_2SiO_{3/2})$, $(PhSiO_{3/2})$, and $(E^1SiO_{3/2})$ units; $(Me_2SiO_{2/2})$, $(PhSiO_{3/2})$, $(E^1SiO_{3/2})$ and $(SiO_{4/2})$ units; $(Me_2SiO_{2/2})$, $(PhSiO_{3/2})$, $(MeSiO_{3/2})$, and $(E^1SiO_{3/2})$ units; $(Ph_2SiO_{2/2})$, $(PhSiO_{3/2})$, and $(E^1SiO_{3/2})$ units; $(MePhSiO_{2/2})$, $(PhSiO_{3/2})$, and $(E^1SiO_{3/2})$ units; $(Me_2SiO_{2/2})$, $(PhSiO_{3/2})$, and $(E^2SiO_{3/2})$ units; $(Me_2SiO_{2/2})$, $(PhSiO_{3/2})$, and $(E\ E^3SiO_{3/2})$ units; $(Me_2SiO_{2/2})$, $(PhSiO_{3/2})$, and $(E^4SiO_{3/2})$ units; $(Me_2ViSiO_{2/2})$, $PhSiO_{3/2})$, and $(E^3SiO_{3/2})$ units; $(Me_2SiO_{2/2})$, $(PhSiO_{3/2})$, $(MeSiO_{3/2})$, and $(E^3SiO_{3/2})$ units; $(Ph_2SiO_{2/2})$, $(PhSiO_{3/2})$, and $(E^3SiO_{3/2})$ units; $(Me_2SiO_{2/2})$, $(Ph_2SiO_{2/2})$, and $(E^1SiO_{3/2})$ units; $(Me_2SiO_{2/2})$, $(Ph_2SiO_{2/2})$, and $(E^3SiO_{3/2})$ units; $(Me_2ViSiO_{1/2})$, $(Me_2SiO_{2/2})$, $(PhSiO_{3/2})$, and $(E^1SiO_{3/2})$ units; $(Me_3SiO_{1/2})$, $(Ph_2SiO_{2/2})$, $(PhSiO_{3/2})$, and $(E^1SiO_{3/2})$ units; $(Me_3SiO_{1/2})$, $(Me_2SiO_{2/2})$, $(PhSiO_{3/2})$, and $(E^3SiO_{3/2})$ units; $(Me_2SiO_{2/2})$, $(PhSiO_{3/2})$, $(E^3SiO_{3/2})$, and $(SiO_2)$ units; $(Me_2SiO_{2/2})$, $(Ph_2SiO_{2/2})$, $(E^1SiO_{3/2})$, and $(SiO_2)$ units; $(Me_3SiO_{1/2})$, $(Me_2SiO_{2/2})$, $(PhSiO_{3/2})$, $(E^1SiO_{3/2})$, and $(SiO_2)$ units; and $(Me_3SiO_{1/2})$, $(Me_2SiO_{2/2})$, $(PhSiO_{3/2})$, $(E^3SiO_{3/2})$, and $(SiO_2)$ units; where Me designates a methyl group, Vi designates a vinyl group, Ph designates a phenyl group, $E^1$ designates a 3-(glycidoxy) propyl group, $E^2$ designates a 2-(glycidoxycarbonyl)propyl group, $E^3$ designates a 2-(3,4-epoxycyclohexyl)ethyl group, and $E^4$ designates 2-(4-methyl-3,4-epoxycyclohexyl) propyl group. The same designations are applicable to the following description herein. It is contemplated that any of the univalent hydrocarbon substituents exemplified in the organopolysiloxane resins above (e.g. Me, Ph, and Vi) may be replaced by other univalent hydrocarbon substituents. For example, an ethyl group or other substituted or unsubstituted hydrocarbyl group may be utilized in place of any of the methyl, phenyl, or vinyl groups above. Further, cationic polymerizable groups other than $E^1$-$E^4$ may be utilized in place of or in addition to $E^1$-$E^4$. However, the species of organopolysiloxane resin identified above are particularly desirable due to their refractive index values and physical properties.

The organopolysiloxane resin may have some residual silicon-bonded alkoxy groups and/or silicon-bonded hydroxyl groups (i.e., silanol groups) from its preparation. The content of these groups may depend on the method of manufacture and manufacturing conditions. These substituents may affect storage stability of the organopolysiloxane resin and reduce thermal stability of the cured product formed from the organopolysiloxane resin. Therefore, in certain embodiments, it is desirable to restrict the formation of such groups. For example, the amount of silicon-bonded alkoxy groups and silicon-bonded hydroxyl groups can be reduced by heating the organopolysiloxane resin in the presence of a minute quantity of potassium hydroxide, thus causing a dehydration and condensation reaction or a de-alcoholation and condensation reaction. It is recommended that the content of these substituents be no more than 2 mole % and preferably no more than 1 mole % of all substituents on silicon atoms.

Although there are no special restrictions with regard to the number-average molecular weight (Mn) of the organopolysiloxane resin, the organopolysiloxane resin has, in certain embodiments, a Mn between 103 and 106 Daltons.

In certain embodiments, the first and/or second compositions may not, alternatively may, further comprise a diluent component. In certain embodiments, the diluent component comprises a silane compound having a single (only one) silicon-bonded cationic polymerizable group.

The single silicon-bonded cationic polymerizable group may be any of the cationic polymerizable groups described above.

The silane compound generally has a dynamic viscosity of less than 1,000, alternatively less than 500, alternatively less than 100, alternatively less than 50, alternatively less than 25, alternatively less than 10, centipoise (cP) at 25 degrees Celsius (° C.). Dynamic viscosity may be measured with a Brookfield Viscometer, an Ubbelohde tube, cone/plate rheology, or other apparatuses and methods. Although the values may vary slightly based on the instrument/apparatus utilized, these values are generally maintained regardless of measurement type. In these embodiments, the silane compound has a boiling point temperature of at least 25, alternatively at least 50, alternatively at least 75, alternatively at least 80, alternatively at least 85, alternatively at least 90, ° C. at a pressure of 1 millimeter mercury (mm Hg) (133.32 Pascals). For example, in certain embodiments, the silane compound has a boiling point temperature of from 80 to 120, alternatively from 90 to 110° C. at a pressure of 1 mm Hg.

In certain embodiments, the silane compound of the diluent component is free from any silicon-bonded hydrolysable groups other than potentially the cationic polymerizable group. For example, certain silicon-bonded hydrolysable groups, such as silicon-bonded halogen atoms, react with water to form silanol (SiOH) groups, wherein the silicon-halogen bond has been cleaved. Other silicon-bonded hydrolysable groups, such as a carboxylic ester, may hydrolyze without cleaving any bond to silicon. To this end, in certain embodiments, the silane compound is free from any silicon-bonded hydrolysable groups that may hydrolyze to form silanol groups. In other embodiments, the cationic polymerizable group of the silane compound is not hydrolysable such that the silane compound is free from any silicon-bonded hydrolysable groups altogether. In these embodiments, the cationic polymerizable group is not hydrolysable, e.g. the cationic polymerizable group is a cyclic ether. Specific examples of hydrolysable groups include the following silicon-bonded groups: a halide group, an alkoxy group, an alkylamino group, a carboxy group, an alkyliminoxy group, an alkenyloxy group, and an N-alkylamido group. For example, certain conventional silane compounds may have, in addition to more than one cationic polymerizable group, a silicon-bonded alkoxy group.

Such silicon-bonded alkoxy groups of these conventional silane compounds may hydrolyze and condense, forming siloxane bonds and increasing a cross-link density of the cured product. In contrast, the silane compound is generally utilized to reduce a cross-link density of the cured product, and thus these hydrolysable groups are, in certain embodiments, undesirable.

In various embodiments, the silane compound of the diluent component has the following general formula:

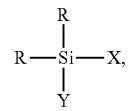

where R is independently selected and defined above, Y is the cationic polymerizable group, and X is selected from R and $SiR_3$.

In certain embodiments, X is R such that the silane compound comprises a monosilane compound. In these embodiments, the silane compound has the general formula $YSiR_3$, where Y and R are defined above. When Y is independently selected from $E^1$-$E^4$ above, the silane compound may be rewritten as, for example, $E^1SiR_3$, $E^2SiR_3$, $E^3SiR_3$, and $E^4SiR_3$. Of $E^1$-$E^4$, $E^3$ is most typical.

In other embodiments, X is $SiR_3$ such that the silane compound comprises a disilane compound. In these embodiments, the single cationic polymerizable group may be bonded to either silicon atom of the disilane, which silicon atoms are typically directly bonded to one another. Although R is independently selected from substituted and unsubstituted hydrocarbyl groups, R is most typically selected from alkyl groups and aryl groups for controlling the refractive index.

Specific examples of the silane compound and methods of their preparation are described in co-pending PCT International Patent Application Number PCT/US14/038149 (DC11701PCT2), filed May 15, 2014.

The silane compound may effectively solubilize the cationic polymerizable material, e.g. the organopolysiloxane resin, thus obviating the need for another solvent. In some embodiments, the first and/or second compositions lack a solvent other than the silane compound. The silane compound also reduces the refractive index of first and/or second compositions, if present therein, and thus the relative amount of the silane compound utilized may be modified to selectively control the refractive index of the first and/or second compositions. For example, the first composition may utilize the silane compound in a lesser amount than the second composition, thereby imparting the second composition with a lesser refractive index than the first composition, all else being equal (e.g. the particular organopolysiloxane resin utilized).

The diluent component typically comprises the silane compound in an amount based on the desired refractive index and other physical properties of the first and/or second compositions. For example, in certain embodiments, the diluent component comprises the silane compound in an amount sufficient to provide at least 3, alternatively at least 5, alternatively at least 10, alternatively at least 15, alternatively at least 20, alternatively at least 25, alternatively at least 30, percent by weight of the silane compound based on the total weight of the second composition. The silane compound is generally present in a lesser amount in the first composition than in the second composition, if utilized in both.

The diluent component may not, alternatively may, comprise compounds or components in addition to the silane compound. For example, the diluent component may comprise a diluent compound other than and in addition to the silane compound. The diluent compound may differ from the silane compound in various respects. For example, the diluent compound may have more than one cationic polymerizable group. Alternatively, the diluent compound may have a single cationic polymerizable group, but may be free from silicon. The diluent component may comprise more than one diluent compound, i.e., the diluent component may comprise any combination of diluent compounds. The diluent compound may be aromatic, alicyclic, aliphatic, etc.

Specific examples of aromatic diluent compounds suitable for the diluent component include polyglycidyl ethers of polyhydric phenols each having at least one aromatic ring, or of alkylene oxide adducts of the phenols such as glycidyl ethers of bisphenol A and bisphenol F, or of compounds obtained by further adding alkylene oxides to bisphenol A and bisphenol F; and epoxy novolak resins.

Specific examples of alicyclic diluent compounds suitable for the diluent component include polyglycidyl ethers of polyhydric alcohols each having at least one alicyclic ring; and cyclohexene oxide- or cyclopentene oxide-containing compounds obtained by epoxidizing cyclohexene ring- or cyclopentene ring-containing compounds with oxidants. Examples include a hydrogenated bisphenol A glycidyl ether, 2-(3,4-epoxycyclohexyl-5,5-spiro-3,4-epoxy)cyclohexane-methadioxane, bis(3,4-epoxycyclohexylmethyl)adipate, vinylcyclohexene dioxide, 4-vinylepoxycyclohexane, bis(3,4-epoxy-6-methylcyclohexylmethyl)adipate, 3,4-epoxy-6-methylcyclohexylcarboxylate, dicyclopentadienediepoxide, ethylene glycol di(3,4-epoxycyclohexylmethyl)ether, dioctyl epoxyhexahydrophthalate and di-2-ethylhexyl epoxyhexahydrophthalate.

Specific examples of aliphatic diluent compounds suitable for the diluent component include polyglycidyl ethers of aliphatic polyhydric alcohols and the alkyleneoxide adducts of the aliphatic polyhydric alcohols; polyglycidyl esters of aliphatic long-chain polybasic acid, homopolymers synthesized by the vinyl polymerization of glycidyl acrylate or glycidyl methacrylate, and copolymers synthesized by the vinyl polymerization of glycidyl acrylate and another vinyl polymer. Representative compounds include glycidyl ethers of polyhydric alcohols, such as 1,4-butanediol diglycidyl ether, 1,6-hexanediol diglycidyl ether, triglycidyl ethers of glycerine, triglycidyl ethers of trimethylolpropane, tetraglycidyl ethers of sorbitol, hexaglycidyl ethers of dipentaerythritol, diglycidyl ethers of polyethylene glycol, diglycidyl ethers of polypropyleneglycol, polyglycidyl ethers of polyether polyol obtained by adding one, two or more kinds of alkylene oxides with an aliphatic polyhydric alcohol such as propylene glycol, trimethylol propane or glycerine, and diglycidyl esters of aliphatic long-chain dibasic acids. In addition, monoglycidyl ethers of aliphatic higher alcohols, phenol, cresol, butylphenol, monoglycidyl ethers of polyether alcohols obtained by adding alkylene oxide to them, glycidyl esters of higher aliphatic acids, epoxidized soy-bean oil, octyl epoxystarate, butyl epoxystearate, epoxidized linseed oil, epoxidized polybutadiene, and the like are exemplified.

Additional examples of diluent compounds suitable for the diluent component include oxetane compounds, such as trimethylene oxide, 3,3-dimethyl oxetane and 3,3-dichloromethyl oxetane; trioxanes, such as tetrahydrofuran and 2,3-dimethyltetrahydrofuran; cyclic ether compounds, such as 1,3-dioxolane and 1,3,6-trioxacyclooctane; cyclic lactone compounds, such as propiolactone, butyrolactone and caprolactone; thiirane compounds, such as ethylene sulfide; thiethane compounds, such as trimethylene sulfide and 3,3-dimethylthiethane; cyclic thioether compounds, such as tetrahydrothiophene derivatives; spiro ortho ester compounds obtained by a reaction of an epoxy compound and lactone; and vinyl ether compounds such as ethylene glycol divinyl ether, alkylvinyl ether, 3,4-dihydropyran-2-methyl (3,4-dihydropyran-2-methyl(3,4-dihydrpyra-ne-2-carboxylate) and triethylene glycol divinyl ether.

If present, the diluent component typically comprises the diluent compound in an amount sufficient to provide from greater than 0 to 30, alternatively from greater than 0 to 10, alternatively from 1 to 5, percent by weight of the diluent compound based on the total weight of the first composition or the second composition, respectively. These values generally reflect any cationic polymerizable diluent compound other than the silane compound in the diluent component, i.e., when a combination of different diluent compounds are utilized, the values above represent their collective amounts. In certain embodiments, the diluent component comprises the silane compound and the diluent compound.

In certain embodiments, each of the first and second compositions further comprises a catalyst. The catalyst of the first composition may be the same as or different than the catalyst of the second composition. Each catalyst independently is effective for enhancing curing of the respective composition. For example, when the first and second compositions are curable upon exposure to active-energy rays, the catalyst may be referred to as a photocatalyst. However, catalysts other than photocatalysts may be utilized, e.g. when the first and/or second compositions are cured upon exposure to heat as opposed to active-energy rays. The photocatalyst may alternatively be referred to as a photopolymerization initiator, and generally serves to initiation photopolymerization of the cationic polymerizable material and the diluent component. In certain embodiments, the first and second compositions independently comprise (A) an organopolysiloxane resin; and (B) a catalyst. The organopolysiloxane resin is described above. The catalyst may comprise any catalyst suitable for such polymerization. Examples of catalysts may include sulfonium salts, iodinium salts, selenonium salts, phosphonium salts, diazonium salts, para-toluene sulfonate, trichloromethyl-substituted triazine, and trichloromethyl-substituted benzene. Additional catalyst include acid generators, which are known in the art. The catalyst may increase rate of curing the composition, decrease time to onset of curing, increase extent of crosslinking of the composition, increase crosslink density of the cured product, or a combination of any two or more thereof. Typically, the catalyst at least increases the rate of curing the composition.

The sulfonium salts suitable for the catalyst may be expressed by the following formula: $R^7_3S^+X^-$, where $R^7$ may designated a methyl group, ethyl group, propyl group, butyl group, or a similar alkyl group with 1 to 6 carbon atoms; a phenyl group, naphthyl group, biphenyl group, tolyl group, propylphenyl group, decylphenyl group, dodecylphenyl group, or a similar aryl or a substituted-aryl group with 6 to 24 carbon atoms. In the above formula, $X^-$ represents $SbF_6^-$, $AsF_6^-$, $PF_6^-$, $BF_4^-$, $B(C_6F_5)_4^-$, $HSO_4^-$, $ClO_4^-$, $CF_3SO_3^-$, or similar non-nucleophilic, non-basic anions. The iodonium salts can be represented by the following formula: $R^7_2I^+X^-$, where $R^7$ is the same as $X^-$ defined above. The selenonium salt can be represented by the following formula: $R^7_3Se^+X^-$, where $R^7$, $X^-$ are the same as defined above. The phosphonium salt can be represented by the following formula: $R^7_4P^+X^-$, wherein $R^7$, $X^-$ are the same as defined above. The diazonium salt can be represented by the following formula: $R^7N_2^+X^-$, where $R^7$ and $X^-$ are the same as defined above. The para-toluene sulfonate can be represented by the following formula: $CH_3C_6H_4SO_3R_8$, wherein $R^8$ is an organic group that contains an electron-withdrawing group, such as a benzoylphenylmethyl group, or a phthalimide group. The trichloromethyl-substituted triazine can be represented by the following formula: $[CCl_3]_2C_3N_3R^9$, wherein $R^9$ is a phenyl group, substituted or unsubstituted phenylethynyl group, substituted or unsubstituted furanylethynyl group, or a similar electron-withdrawing group. The trichloromethyl-substituted benzene can be represented by the following formula: $CCl_3C_6H_3R^7R^{10}$, wherein $R^7$ is the same as defined above, $R^{10}$ is a halogen group, halogen-substituted alkyl group, or a similar halogen-containing group.

Specific examples of catalysts suitable for the first and/or second compositions include triphenylsulfonium tetrafluoroborate, triphenylsulfonium hexafluoroantimonate, triphenylsulfonium trifurate, tri(p-tolyl)sulfonium hexafluorophosphate, p-tertiary-butylphenyl diphenylsulfonium hexafluoroantimonate, diphenyliodonium tetrafluoroborate, diphenyliodonium hexafluoroantimonate, p-tertiary-butylphenyl biphenyliodonium hexafluoroantimonate, di(p-tertiary-butylphenyl) iodonium hexafluoroantimonate, bis(dodecylphenyl)iodonium hexafluoroantimonate, triphenylselenonium tetrafluoroborate, tetraphenylphosphonium tetrafluoroborate, tetraphenylphosphonium hexafluoroantimonate, p-chlorophenyldiazonium tetrafluoroborate, benzoylphenyl para-toluenesulfonate, bis(trichloromethyl) phenyl triazine, bis(trichloromethyl)furanyl triazine, p-bis (trichloromethyl)benzene, etc.

The catalyst may comprise two or more different species, optionally in the presence of a carrier solvent.

The catalyst may be present in the first and second compositions in independently varying amounts. Generally, the catalyst is present in an amount sufficient to initiate polymerization and curing upon exposure to active-energy rays (i.e., high-energy rays), such as ultraviolet rays. In certain embodiments, the catalyst is utilized in each of the first and second compositions in an amount of from greater than 0 to 5, alternatively from 0.1 to 4, percent by weight based on the total weight of the respective composition.

The first and/or second compositions may be solventless. In these embodiments, the diluent component generally solubilizes the cationic polymerizable material sufficient to pour and wet coat the first and/or second compositions. However, if desired, the first and/or second compositions may further comprise a solvent, e.g. an organic solvent. Solventless, as used herein with reference to the first and/or second compositions being solventless, means that total solvent, including any carrier solvent, may be present in the respective composition in an amount of less than 5, alternatively less than 4, alternatively less than 3, alternatively less than 2, alternatively less than 1, alternatively less than 0.1, percent by weight based on the total weight of the respective composition.

The solvent, if utilized, is generally selected for miscibility with the cationic polymerizable material and the diluent component. Generally, the solvent has a boiling point temperature of from 80° C. to 200° C. at atmospheric pressure, which allows for the solvent to be easily removed via heat or other methods. Specific examples of solvents include isopropyl alcohol, tertiary-butyl alcohol, methyl ethyl ketone, methyl isobutyl ketone, toluene, xylene, mesitylene, chlorobenzene, ethylene glycol dimethyl ether, ethylene glycol diethyl ether, diethylene glycol dimethyl ether, ethoxy-2-propanolacetate, methoxy-2-propanolacetate, octamethylcyclotetrasiloxane, hexamethyldisiloxane, etc. Two or more solvents may be utilized in combination.

The first and/or second compositions may optionally and additionally include any other suitable component(s), such as a coupling agent, an antistatic agent, an ultraviolet absorber, a plasticizer, a leveling agent, a pigment, a catalyst, an inhibitor of the catalyst, and so on. The inhibitor of the catalyst may function to prevent or slow rate of curing until the catalyst is activated (e.g. by removing or deactivating the inhibitor).

In certain embodiments, the first and second compositions are each in the form of a liquid with a dynamic viscosity of from 20 to 10,000 mPa·s at 25° C. The dynamic viscosities may be measured with a Brookfield Viscometer, an Ubbelohde tube, cone/plate rheology, or other apparatuses and methods. Although the values may vary slightly based on the instrument/apparatus utilized, these values are generally maintained regardless of measurement type.

The optical connector 30, and the associated optical assembly 20 formed from the optical connector 30, may be formed from the method as described below in FIGS. 2-7.

Referring first to FIG. 2, the method begins by positioning the first optical assembly 20 relative to the second optical assembly 40 such that there is a gap 80 between the optical interface 26 and the waveguide interface 50. In this position, preferably at least one of the at least one optical elements 22 is aligned with a corresponding one of the at least one optical elements 42 across the gap 80.

Figure 3:
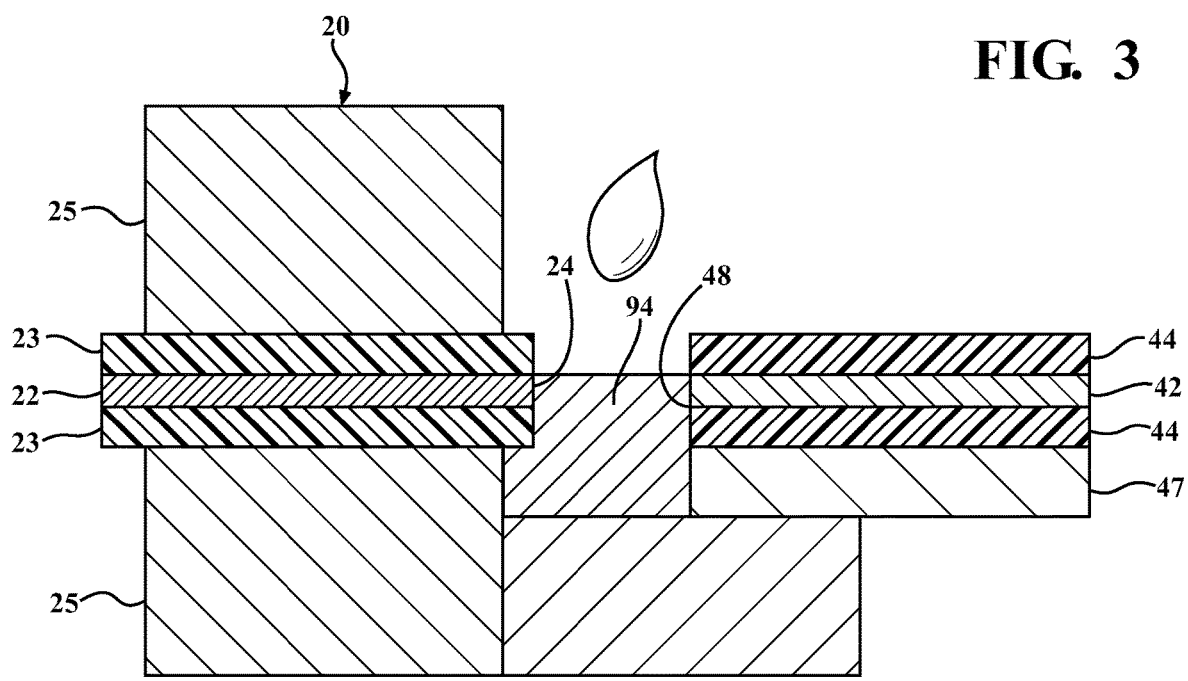

Next, as shown in FIG. 3, the method further comprises applying a first composition having a first refractive index ($RI^1$) within the gap 80 to form a first layer 94 such that the first layer 94 is in contact with the terminal end 24 of each of the at least one optical elements 22 at the first optical interface 26 and such that the first layer 94 is in contact with the terminal end 48 of each of the at least one optical elements 42 at the second optical interface 50.

In certain embodiments, the first layer 94 is applied onto the first substrate 47 contained within the first and second optical assemblies 20, 40. Alternatively, the first layer 94 is applied onto an inner surface 91 of the housing 25 and/or onto an inner surface 93 of the housing 45, or onto both the inner surface 91 and 93, when the housing 25 is coupled to the housing 45.

The first composition, as described above, is a curable composition and may be selected based at least on the desired first refractive index and other factors, e.g. desired cure mechanism.

The first composition may be applied on the substrate 47 or to the inner surfaces 91 and 93 via various methods. For example, in certain embodiments, the step of applying the first composition comprises a wet coating method. Specific examples of wet coating methods suitable for the method include dip coating, spin coating, flow coating, spray coating, roll coating, gravure coating, sputtering, slot coating, and combinations thereof.

Figure 4:
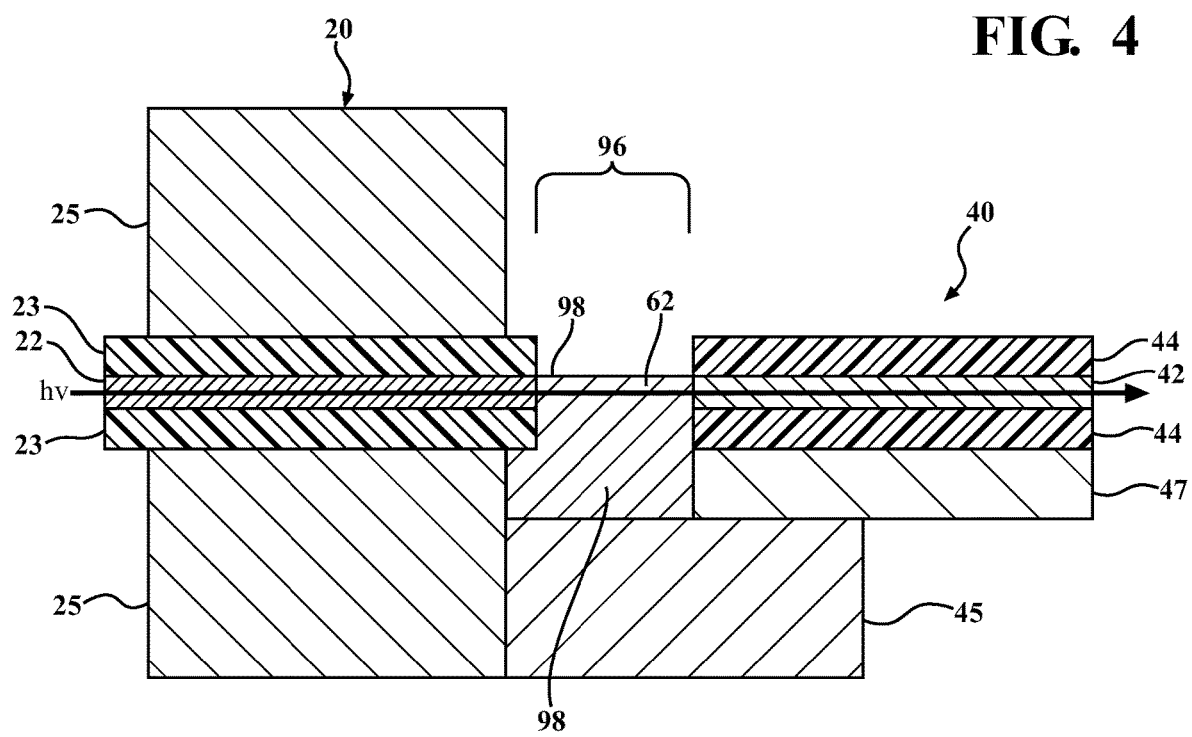

Next, as shown in FIG. 4, the method further comprises applying a curing condition to a target portion of the first layer 94, without applying the curing condition to a non-target portion of the first layer, to form a contrast layer 96 including at least one cured bridge portion 62 and at least one uncured portion 98. Each one of the at least one cured bridge portions 62 extends within the gap 80 from the terminal end 24 of one of the respective at least one optical elements 22 to the corresponding aligned terminal end 48 of a respective one of the at least one optical elements 42.

The method by which the first layer 94 is selectively cured, and thus the curing condition utilized, is determined by at least the first composition. For example, in certain embodiments, the first composition and the first layer formed from the composition are curable upon exposure to active-energy rays, i.e., the first layer is selectively cured by selectively irradiating the first layer with active-energy rays. The active-energy rays may comprise ultraviolet rays, electron beams, or other electromagnetic waves or radiation. Alternatively, the first layer may be thermally cured. In these embodiments, the first layer 94 is selectively cured by selectively heating the first layer 94, e.g. selectively heating the first layer with a heating element. Examples of suitable heating elements include resistive or inductive heating elements, infrared (IR) heat sources (e.g., IR lamps), and flame heat sources. An example of an inductive heating element is a radio frequency (RF) induction heating element.

Preferably, as shown in FIG. 4, the first layer 94 is cured by transmitting light of a first predetermined wavelength in the ultraviolet light range from the at least one optical element 22 through the respective terminal end 24 and within the target portion of the first composition comprising the first layer 94 for a period of time sufficient to induce refractive index changes in the target portion of the first composition from $RI^1$ to $RI^{1'}$ and form the at least one cured bridge portions 62 that each extend from the respective terminal end 24 of the respective one of the optical elements 22 of the first optical assembly 20 to the corresponding one of the respective optical elements 42 of the second optical assembly 40.

Figure 5:
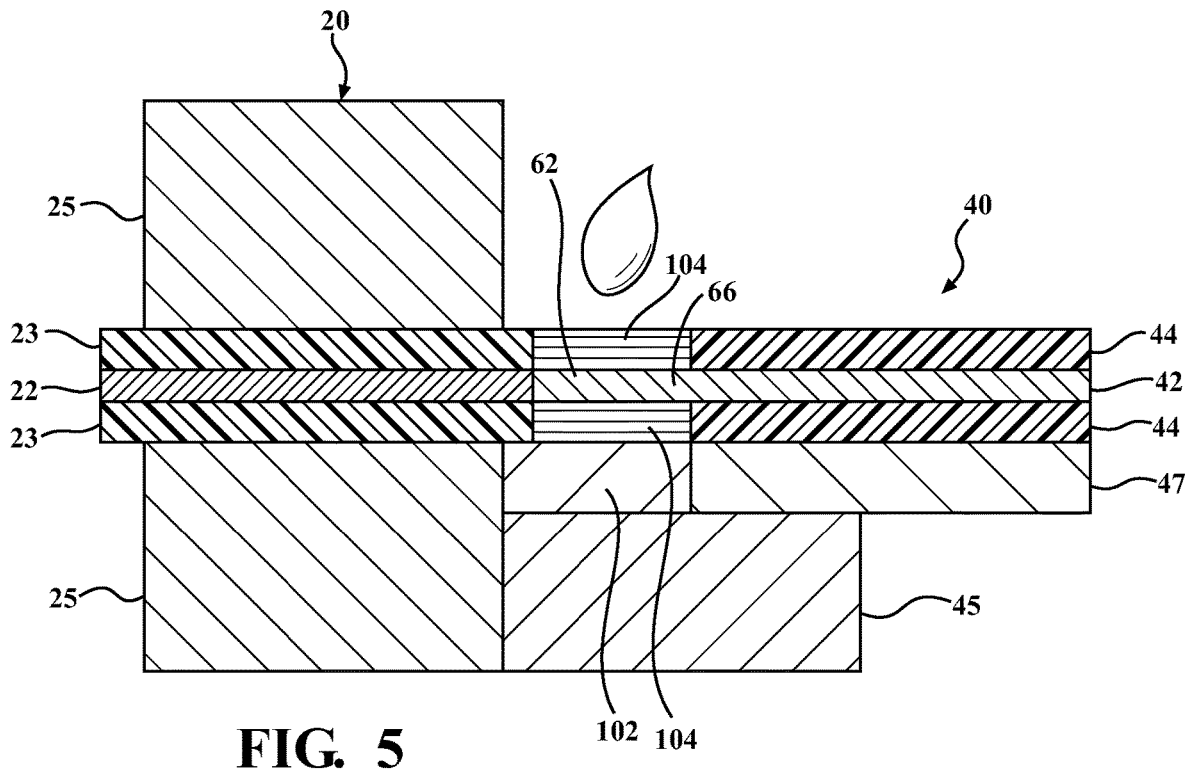

Next, as shown in FIG. 5, the method further comprise applying a second composition having a second refractive index ($RI^2$) on the contrast layer 96 to form a second layer 102 and mixing at least a portion of the second layer 102 and at least a portion of the at least one uncured portion 98 of the contrast layer 96 to form at least one intermixed portion 104 having a third refractive index ($RI^3$) in the contrast layer 96. After this mixing step, each one of the at least one cured bridge portions 62 is at least partially surrounded by at least one of the at least one intermixed portion 104 from the respective first terminal end 64 to the second terminal end 66, but wherein the terminal ends 64, 66 are not covered by the second layer 102 or intermixed portion 104, as described above.

In certain embodiments, a portion of the second layer 102 is not mixed with the uncured portion 98 of the contrast layer 96 and remains as an unmixed portion (shown as 102 in FIG. 5). In these embodiments, a portion of the second layer 102 may partially surround one or more of the at least one bridge portions 62, wherein the second layer 102 and one of the at least one intermixed portion 104 collectively entirely surround a respective one of the at least one bridge portions 62.

Preferably, however, the entirety of the second composition is intermixed with the at least one uncured portion 98 to form the intermixed portion 104 (i.e., there is no second layer 102 present after mixing). In this preferred embodiment, each one of the at least one cured bridge portions 62 is entirely surrounded by the one of the at least one intermixed portion 104 from the respective first terminal end 64 to the second terminal end 66, but wherein the terminal ends 64, 66 are not covered by the intermixed portion 104, as described above.

The first and second composition and the at least one intermixed portion 104 are different from one another. In addition, $RI^1$, $RI^2$, and $RI^3$ are different from one another.

The second composition may be applied on the first layer 94 via various methods including those described above for the application of the first composition. For example, in certain embodiments, the step of applying the first composition on the first layer 94 comprises a wet coating method. Specific examples of wet coating methods suitable for the method include dip coating, spin coating, flow coating, spray coating, roll coating, gravure coating, sputtering, slot coating, and combinations thereof.

Figure 6:
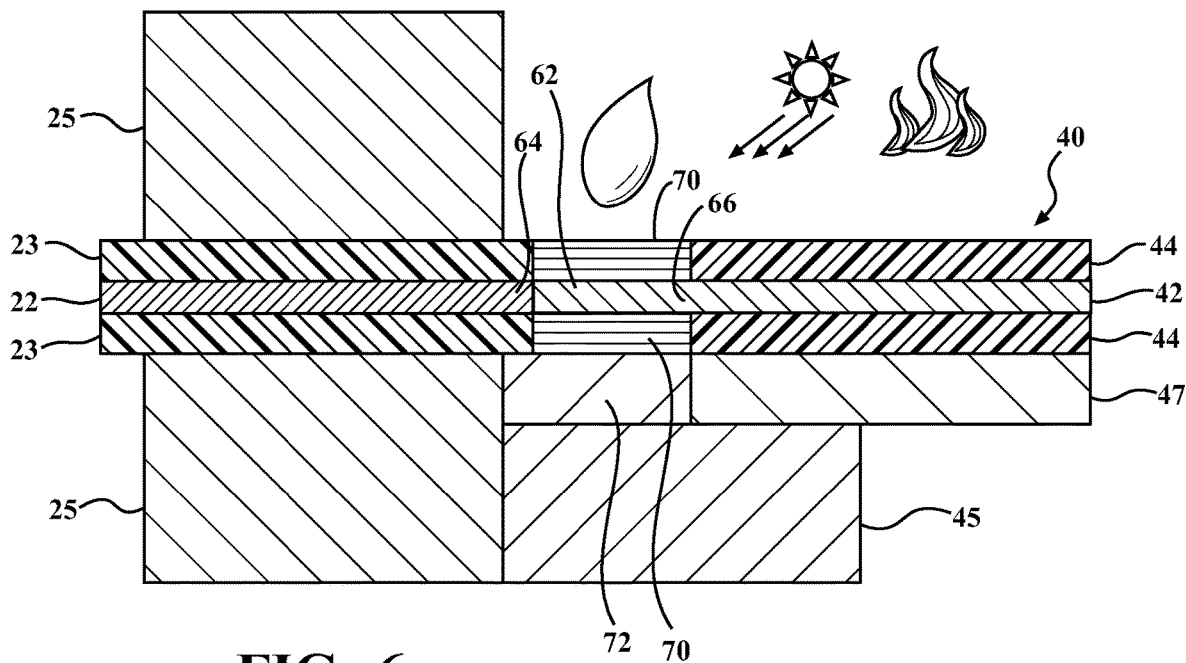

Next, as shown in FIG. 6, the method further comprises applying a second curing condition to cure the intermixed portion 104 and the optionally present second layer 102 to form the cured intermixed portion 70 and the cured optional second portion 72, and hence form the optical connector 30 and completed first optical device 15.

The method by which the second layer 102, when present, and at least one intermixed portion 104 is selectively cured, and thus the curing condition utilized, is determined by at least the first composition and the second composition.

For example, in certain embodiments, the first composition and second composition used to form the second layer 102, if present, and intermixed portion 104 are curable upon exposure to active-energy rays (i.e., the second layer 102, when present, and at least one intermixed portion 104 are selectively cured by selectively irradiating the first layer with active-energy rays). The active-energy rays may comprise ultraviolet rays, electron beams, or other electromagnetic waves or radiation.

Alternatively, the second layer 102, when present, and at least one intermixed portion 104 may be thermally cured. In these embodiments, the second layer 102, when present, and at least one intermixed portion 104 are cured by selectively heating the second layer 102 and at least one intermixed portion 104, e.g. selectively heating the second layer 102 and at least one intermixed portion 104 with a heating element. Examples of suitable heating elements include resistive or inductive heating elements, infrared (IR) heat sources (e.g., IR lamps), and flame heat sources. An example of an inductive heating element is a radio frequency (RF) induction heating element.

In certain embodiments, the second layer 102, if present, and at least one intermixed portion 104 are cured by heating the layer 102 and portion 104 to a temperature ranging from 90 to 260° C.

In still other embodiments, a combination of methods for curing may be utilized. Thus, for example, the second layer 102, if present, and at least one intermixed portion 104 may be cured both by exposure to active-energy rays and by heating, as described above.

The resultant optical device 15, as shown in FIG. 6, is formed wherein each of the cured bridge portions 62 is surrounded by the cured intermixed portion 70 and the cured second portion 72, when present, from the respective first terminal end 64 to the second terminal end 66, but wherein the terminal ends 64, 66 are not covered by the cured intermixed portion 70 and the cured second portion 72 (i.e., between the terminal end 24 of one of the at least one optical element 22 of the first optical assembly 20 and the corresponding terminal end 48 of the respective one of the at least one optical element 42 of the second optical assembly 40). In preferred embodiments, each of the cured bridge portions 62 having a refractive index $RI^{1'}$ are surrounded by a cured intermixed portion 70 having a refractive index $RI^{2'}$ from the respective first terminal end 64 to the second terminal end 66, but wherein the terminal ends 64, 66 are not covered by the cured intermixed portion 70. Alternatively, in certain embodiments, each of the cured bridge portions 62 having a refractive index $RI^{1'}$ are surrounded by a cured intermixed portion 70 having a refractive index $RI^{2'}$ and a cured second portion 72 having a refractive index $RI^{3'}$ from the respective first terminal end 64 to the second terminal end 66, but wherein the terminal ends 64, 66 are not covered by the cured intermixed portion 70 and the cured second portion 72.

In still other embodiments, at least one of the cured bridge portions 62 having a refractive index $RI^{1'}$ are thus surrounded by a cured intermixed portion 70 having a refractive index $RI^{2'}$ from the respective first terminal end 64 to the second terminal end 66, but wherein the terminal ends 64, 66 are not covered by intermixed portion 104, and wherein the second layer 72 is present and surrounds a cured intermixed portion 70 and does not cover the respective terminal ends 64, 66.

In any of these embodiments, an optical connector 30 is formed wherein each of the at least one bridge portions 62 has a lower refractive index that the cladding portion surrounding it (whether such cladding portion comprises the cured intermixed portion 70 or the combination of the cured intermixed portion 70 and the cured second portion 72 as noted above). Stated another way, there is a contrast in the refractive index between the low refractive index bridge portion 62 and the higher refractive index cladding portion, and more specifically the higher refractive index cured intermixed portion 70 and optional cured second portion 72, that surrounds it. One of ordinary skill would appreciate that the contrast between the lower refractive index cured bridge portions 62 and the higher refractive index cured cladding portion, and more specifically the higher refractive index and cured intermixed layer 70 and optional cured second portion 70, allows electromagnetic radiation (i.e., one or more electromagnetic waves) to be guided along the length of the bridge portions 62 with minimal losses to the intermixed layer 70 and to the optional second layer 72. Thus, the present invention provides a higher efficient optical connector 30 for propagating one or more electromagnetic waves between the first optical assembly 20 and the second optical assembly 40

In addition, precision alignment requirements for optical connectors will be lessened as will system misalignment tolerancing by use of the optical connectors 30 formed in accordance with the method of the present invention due to the fact that the interface of the cured bridge portion 62 will conform in size and shape to the size and shape of the respective terminal ends 24 or 48 of the optical elements 22, 42 to which it is aligned as a result of the application of the first curing condition to form the respective bridge portion 62. For example, the bridge portion 62 will have a rounded cross-sectional view at the terminal end 64 or 66 that corresponds in size and shape to the corresponding rounded shape of the terminal end 24 or 48 of the optical element 22 or 42. Similarly, the bridge portion 62 will have a squared size and shape in cross-section at the terminal end 64 or 66 wherein the optical element 22 or 42 is squared at it respective terminal end 24 or 48. Such conformance between the respective terminal end 64 or 66 and the corresponding terminal end 24 or 48 is also thought to minimize electromagnetic radiation losses at the interface between the respective optical element 22 or 42 and the bridge portion 62.

Figure 13:
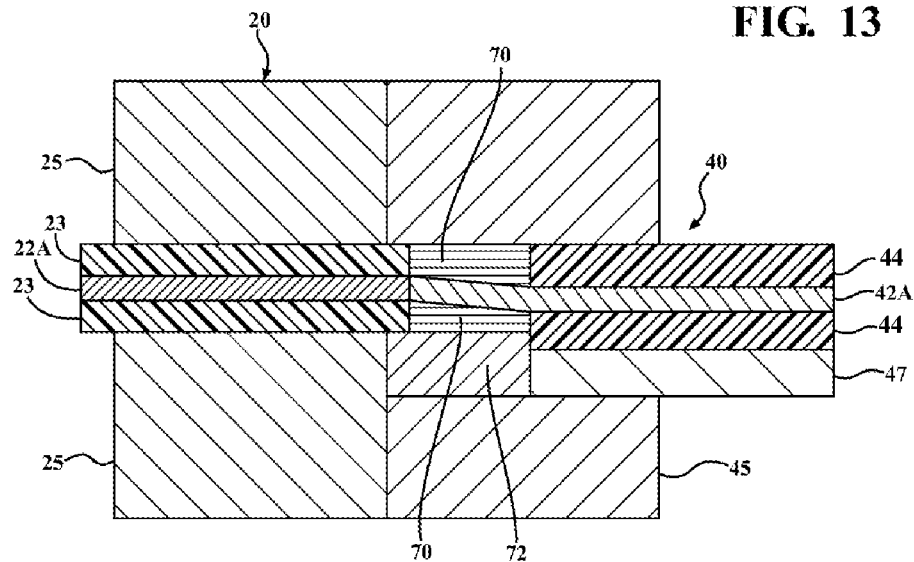
FIG. 13 illustrates a perspective view of an optical device including an optical connector formed between optical devices having misaligned optical elements in accordance with another embodiment of the present invention.
Figure 14:
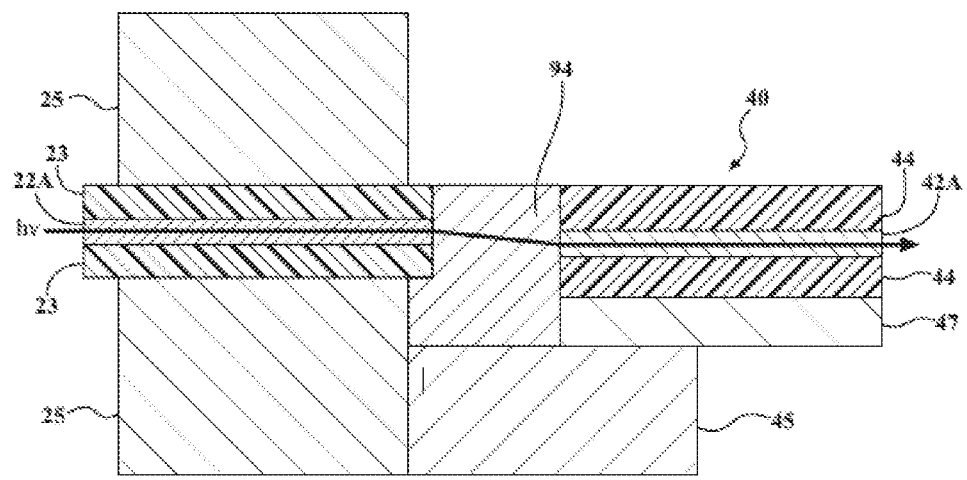
FIG. 14 illustrates a perspective view of one stage of the method for forming the cured bridge portion of the optical connector of FIG. 13.

In still other embodiments, an optical connector 30 forms a cured bridge portion 62A that extends between misaligned optical elements 22A and 42A, as shown in FIGS. 13-14. The process for forming the optical connector 30 and optical device 15 follows the same general method as described above with respect to FIGS. 2-6, with the exception that in FIG. 14 (as compared with FIG. 4), the transmitted light of the first predetermined wavelength bends such that it is from the respective terminal end 24 of the first optical element 22A to the terminal end 48 of the second optical element 42A, thereby curing the cured bridge portion 62 is a slightly angled direction relative to the length of the first optical element 22A and second optical element 42A.

In addition, polishing will likely not be required because the terminal end 64 or 66 of each of the cured bridge portions 62, as the bridge portion 62 will have roughness that allows for better adhesion to the respective optical element 22 or 42. Still further, fiber protrusion concerns in certain optical systems having MT connections may be alleviated with the connection process of the present invention.

Also, the manufacturing process for forming the optical connectors 30 of the present invention is simple and reproducible for coupling a wide variety of optical assemblies 20, 40 and 220 having similar or different optical elements 22, 42 or 222 as described above.

In still other embodiments, a separate optical device 215 different from the first optical device 15 may be formed from first optical device 15 having the optical connector 30 that is formed in accordance with the method above. This further method is shown in FIGS. 7 to 9.

Figure 7:
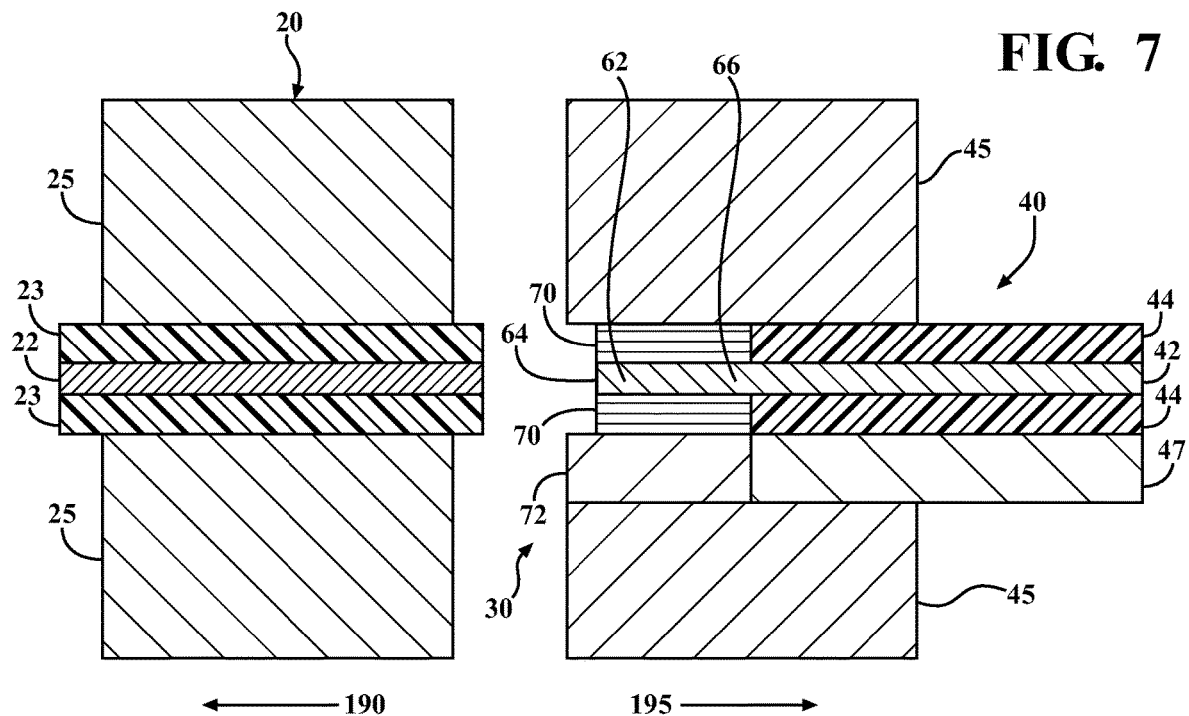
FIGS. 7-9 illustrate perspective views at different stages of a method for forming a second optical device from a first optical device including an optical connector in accordance with one embodiment of the present invention.

Referring first to FIG. 7, the method for forming a second optical device 215 begins by disconnecting the first optical assembly 20 from the formed optical connector 30 (and hence from the second optical assembly 40) such that each one of the at least one cured bridge portions 62 remains in contact with the terminal end 48 of the respective one of the at least one optical elements 42 of the second optical assembly 40. This can be done in any number of ways, preferably by simply moving the first optical assembly 20 in a direction away from the second optical assembly 40, as shown by arrow 190, or by moving the second optical assembly 40 in a direction away from the first optical assembly 20, as shown by arrow 195. In this process, the housing 25 is uncoupled or otherwise disconnected from the housing 45.

In these embodiments, the first optical assembly 20 and second optical assembly 40 include different forms of the optical elements 22 and 42, and the cured bridge portion 62 adheres more strongly to the optical elements 42 than to the optical elements 22, and thus remain in contact with the optical elements 42 when the first optical assembly 20 is moved away from the second optical assembly 40.

Figure 8:
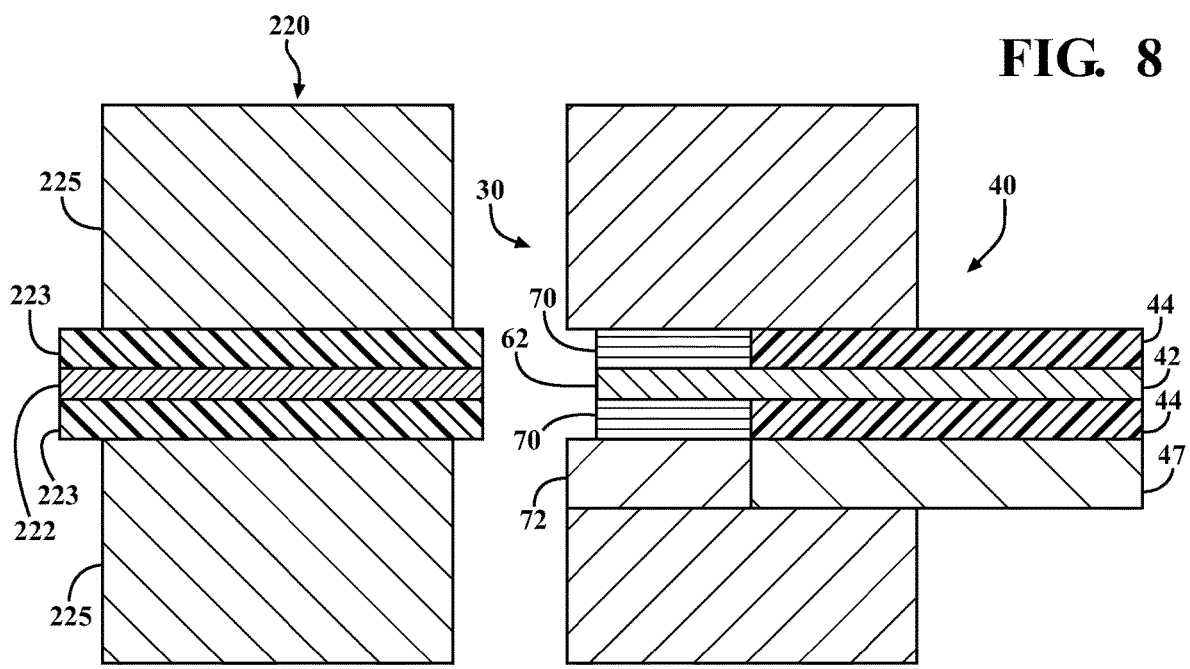
Figure 9:
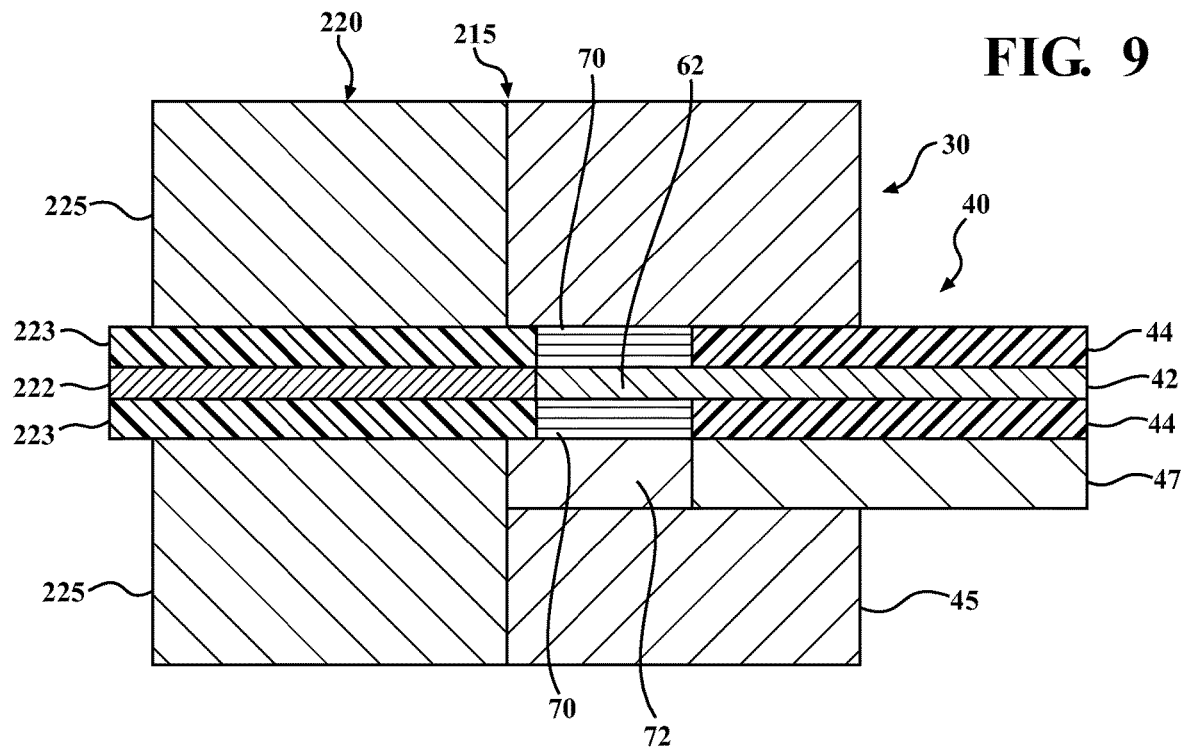

Next, as shown in FIG. 8, a third optical assembly 220 different than the first optical assembly 20 is provided.

The third optical assembly 220 has at least one optical element 222 with a terminal end of each of the at least one optical elements 222 terminating at a second optical interface. The third optical assembly 220 also includes a housing 225 and a cladding 223 surrounding the optical elements 222. The optical element 222, similar to the optical element 22 or 42, refers to any device or material that is capable of guiding one or more electromagnetic waves (such as, for example, one or more light waves in the ultraviolet light spectrum or one or more light waves in the visible light spectrum) along its respective length. Suitable examples of optical elements that may comprise the optical element 222 thus include, but are not limited to, optical fibers, polymer waveguides, lenses, transmitting modules, receiving modules, or transceivers (modules including both transmitting and receiving modules).

As noted above, however, the third optical assembly 220, including such optical elements 222, is different than the first optical assembly 20 including the optical elements 22. Preferably, the number of optical elements 222, and the size and shape of these optical elements 222, in certain embodiments, are similar to the number, size and shape of the optical elements 22 of the first optical assembly 20, although in certain other embodiments the number, size or shape could be different. Similarly, the relative positioning of the at least one optical element 222 within the third optical assembly 220 may be the same or different than in the first optical assembly 20.

As also shown in FIG. 8, the optical connector 30 coupled to the second optical assembly 40 is positioned relative to the third optical assembly 220 along the third optical interface such that the terminal end of each one of the at least one optical elements 222 of the third optical assembly 220 is adjacent to the terminal end 64 of a respective one of the at least one cured bridge portions 62.

Next, as shown in FIG. 9, the third optical assembly 220 is moved into contact with the second optical assembly 40 such that the terminal end 224 of each one of the at least one optical elements 222 of the third optical assembly 220 is contacted to the terminal end 64 of a respective one of the at least one cured bridge portions 62. In this manner, a new optical device 215 comprising the third optical assembly 220 coupled to the second optical assembly 40 through the optical connector 30 is formed.

The method as described in FIGS. 7-9 may thus be used to easily connect any two optical devices having similarly positioned optical elements. The method described in FIGS. 7-9 also allows the second optical assembly 40 including the coupled optical connector 30 to be coupled to a first optical assembly 20, subsequently uncoupled from this first optical assembly 20, and connected to a third optical assembly 220 (as well as subsequently being unconnected from the third optical assembly 220 and reconnected to the first optical assembly 20) to form a wide variety of optical devices.

The appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

Example 1: Fabrication of Optical Connector with One or More Cured Bridge Portions A twelve fiber terminal 62.5 um MT connector was placed onto a mounting unit. The MT connector included a slot having a lower surface with a terminal portion of each of the twelve fibers terminating at the fiber interface of the slot, with the fiber interface extending in a direction generally perpendicular from the lower surface. Twelve 50×50 um polymer waveguides on 250 micrometers (μm) pitch were placed within a slot in the MT connector. Each of the terminal ends of the twelve fibers of the MT connector was then aligned with a corresponding terminal end of a respective one of the twelve polymer waveguides via a submicron (<1 μm) precision xyz stage. After alignment was completed, a 500 μm gap was set between the terminal ends of the twelve polymer waveguides and the terminal ends of the twelve fibers of the MT connector within the slot.

A drop of a UV photodefinable silicone material with a refractive index of approximately 1.533 was applied via pipette onto the lower surface of the slot within the gap of the MT connector such that the drop covered each of the respective terminal ends of both the fibers of the MT connector and the polymer waveguides.

The drop of silicone material was selectively polymerized by sending UV light through the fiber interface of one of the twelve fibers of the MT connector. The 375 nm light exiting the fiber induced approximately a 1.2 Joules per square centimeter ($J/cm^2$) UV dose of radiation on the photodefinable silicone material to radiation cure a portion of the drop, therein creating the cured bridge portion within the drop extending from one of the fibers of the MT connector to a corresponding polymer waveguide. The uncured excess material surrounding the cured bridge portion was then removed with toluene and the MT terminals were separated so that the cured bridge portion remained attached to the polymer waveguide interface. Thus was fabricated the optical connector with one or more cured bridge portions. The cured bridge portion and polymer waveguide was then placed onto a transparent sheet and imaged via phase contrast microscopy, as shown in FIG. 15, wherein the indicated scale is 0.5 mm.

Example 1a: Fabrication of Another Optical Connector with One or More Cured Bridge Portions Example 1 was repeated in substantially the same manner as described above. However, in this example, the drop of silicone material was selectively polymerized by sending UV light through the fiber interface of more than one of the twelve fibers of the MT connector for multiple waveguide bridges on a single interface. Thus was fabricated another optical connector with one or more cured bridge portions. The multiple cured bridge portions and polymer waveguides were then placed onto a transparent sheet and imaged via phase contrast microscopy, as shown in FIG. 16, wherein the indicated scale is 50 µm.

Figure 15:
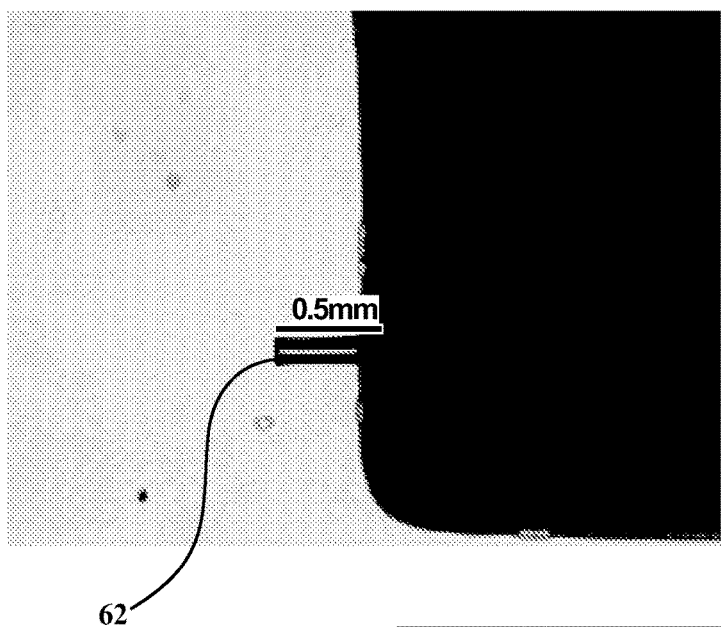
FIG. 15 is a phase contrast microscopy image of a single cured bridge portion coupled to a polymer waveguide formed in accordance with one embodiment of the present invention.
Figure 16:
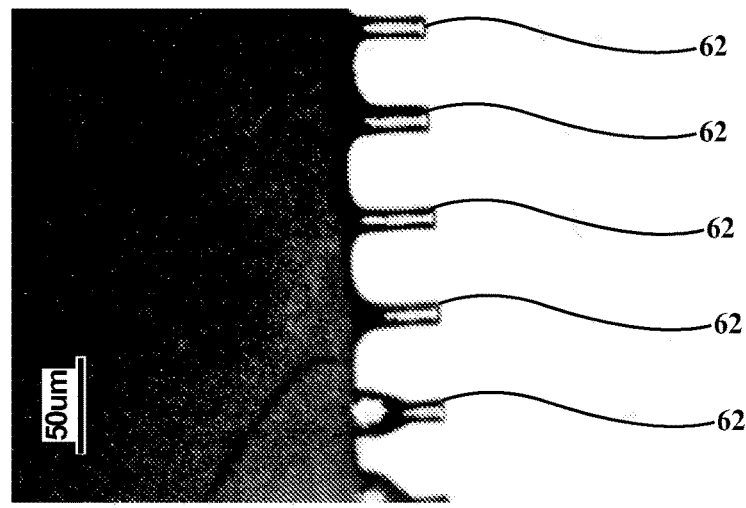
FIG. 16 is a phase contrast microscopy image of multiple cured bridge portions coupled to corresponding polymer waveguides formed in accordance with one embodiment of the present invention.

The results illustrated in FIGS. 15 and 16 demonstrated that one or more cured bridge portions 62 can be formed in accordance with the methods of the present invention.

Example 2: Fabrication of Optical Connector Having a Multiple Cured Bridge Portion A twelve fiber terminal 62.5 um MT connector was placed onto a mounting unit. The MT connector included a slot having a lower surface with a terminal portion of each of the twelve fibers terminating at the fiber interface of the slot, with the fiber interface extending in a direction generally perpendicular from the lower surface. Twelve 50×50 um polymer waveguides on 250 µm pitch were placed within a slot in the MT connector. Each of the terminal ends of the twelve fibers of the MT connector was then aligned with a corresponding terminal end of a respective one of the twelve polymer waveguides via a submicron (<1 µm) precision xyz stage. After alignment was completed, a 500 µm gap was set between the terminal ends of the twelve polymer waveguides and the terminal ends of the twelve fibers of the MT connector within the slot.

A drop of an ultraviolet (UV) photodefinable silicone material with a refractive index of approximately 1.533 was applied via pipette onto the lower surface of the slot within the gap of the MT connector such that the drop covered each of the respective terminal ends of both the fibers of the MT connector and the polymer waveguides.

The drop of silicone material was selectively polymerized by sending UV light through the fiber interface of more than one of the twelve fibers of the MT connector. The 375 nm light exiting the fiber induced approximately a 1.2 J/cm$^2$ UV dose of radiation on the photodefinable silicone material to radiation cure a portion of the drop, therein creating the cured bridge portion within the drop extending from one of the fibers of the MT connector to a corresponding polymer waveguide.

Next, a drop of a second UV photodefinable silicone with refractive index of approximately 1.51 was applied to the uncured portion of the first UV photodefinable silicone via pipette. The second UV photodefinable silicone was then allowed to mix with the uncured portion of the first UV photodefinable material for approximately 1 minute to form an intermixed portion. A second UV blanket cure of approximately 1.2 J/cm$^2$ was applied to the intermixed portion via a broad spectrum UVA bulb to radiation cure the intermixed portion surrounding each of the cured bridge portions.

The polymer waveguides were then separated from twelve fiber terminal 62.5 um MT connector, with the cured bridge portions and the radiation cured intermixed portion surrounding the cured bridge portions remaining connected to each of the polymer waveguides. The polymer waveguide with the connected cured bridge portions and radiation cured intermixed portion were then introduced to an oven and thermally cured at 130° C. for approximately 30 minutes to form the optical connector in accordance with the present invention. Thus was fabricated an optical connector having a multiple cured bridge portion.

Figure 17:
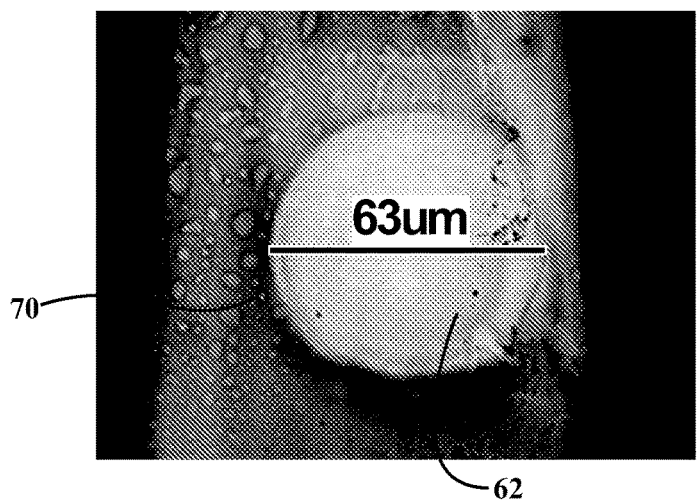
FIG. 17 is phase contrast microscopy image of an end view of one of the cured bridge portions contained within a cured intermixed portion in accordance with one embodiment of the present invention.

The end face of optical connector opposite the connected polymer waveguides (i.e., the terminal end of the optical connector corresponding to the end previously connected to the twelve fiber terminal 62.5 um MT connector) was then imaged via phase contrast microscopy. The contrast in the micrograph between the cured bridge portion 62 and the surrounding cured intermixed portion 70, as illustrated in FIG. 17, wherein the indicated scale is 63 µm, confirmed that the optical connector was formed wherein the cured bridge portion had a higher refractive index than the surrounding cured intermixed portion.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described. Calling an example a comparative example does not mean that it is prior art.

What is claimed is:

1. A method of preparing an optical connector for use in connecting a respective one of at least one optical element of a first optical assembly to a corresponding one of at least one optical element of a second optical assembly, wherein one or more electromagnetic waves may be guided between the respective one of the at least one optical element of the first optical assembly and the corresponding one of at least one optical element of the second optical assembly, wherein the optical connector is located within a gap between the first optical assembly and the second optical assembly and includes a contrast layer having at least one cured bridge portion and at least one uncured portion, wherein each one of the at least one cured bridge portion extends continuously from a terminal end of one of the at least one optical element of the first optical assembly to a corresponding terminal end of a respective one of the at least one optical element of the second optical assembly, and wherein the contrast layer is formed from a first composition comprising a first organopolysiloxane resin, the first composition having a first refractive index (RI$^1$), the method comprising:

applying a second composition comprising a second organopolysiloxane resin, the second composition having a second refractive index (RI$^2$) on the contrast layer to form a second layer;

mixing a portion of the second layer with the at least one uncured portion of the contrast layer to form at least one intermixed portion having a third refractive index (RI$^3$) in the contrast layer such that each one of the at least one cured bridge portions is at least partially surrounded by a respective one of the at least one intermixed portions between the terminal end of one of the at least one optical element of the first optical assembly and the corresponding terminal end of the respective one of the at least one optical element of the second optical assembly while leaving a portion of the second composition that is not intermixed with contrast layer; and applying a second curing condition to cure the at least one intermixed portion and the portion of the second composition that is not intermixed with the contrast layer and prepare the optical connector, wherein 2 to 70 mole % of all siloxane units of each of the first and second organopolysiloxane resins have cationic polymerizable groups and the at least one intermixed portion are different from one another and wherein the resulting cured optical connector has three different cured portions: cured first composition, cured intermixed portion and cured second composition each with a different index of refraction where $RI^1>RI^3>RI^2$ when measured at a same wavelength and temperature.

2. The method according to claim 1, wherein the mixing step is performed such that each one of the at least one cured bridge portion is surrounded by a respective one of the at least one intermixed portions between the terminal end of one of the at least one optical element of the first optical assembly and the corresponding terminal end of the respective one of the at least one optical element of the second optical assembly.

3. The method of claim 1:
wherein the applying a second curing condition to cure the at least one intermixed portion comprises exposing the at least one intermixed portion to active-energy rays; or
wherein the applying a second curing condition to cure the at least one intermixed portion comprises exposing the at least one intermixed portion to heat; or
wherein the applying a second curing condition to cure the at least one intermixed portion comprises exposing the at least one intermixed portion to heat at a temperature ranging from 90 to 260 degrees Celsius; or
wherein the applying a second curing condition to cure the at least one intermixed portion comprises exposing the at least one intermixed portion to active-energy rays and exposing the at least one intermixed portion to heat.

4. The method of claim 1 wherein the first and second compositions independently comprise:
(B) a catalyst for enhancing curing of the organopolysiloxane resin.

5. The method of claim 1:
wherein the gap has a length, and the length of the gap ranges between 0 and 1000 micrometers; or
wherein the gap has a length, and the length of the gap ranges from 15 to 500 micrometers.

6. The method according to claim 1 wherein each respective one of the at least one optical element of the first optical assembly is selected from the group consisting of an optical fiber, a polymer waveguide, a lens, a transmitting module, a receiving module, and a transceiver.

7. The method according to claim 6, wherein the corresponding one of the at least one optical element of the second optical assembly is selected from the group consisting of an optical fiber, a polymer waveguide, a lens, a transmitting module, a receiving module, and a transceiver.

8. The method according to claim 1 wherein the respective one of the at least one optical element of the first optical assembly is the same as the corresponding one of the at least one optical element of the second optical assembly.

9. The method according to claim 1 wherein the respective one of the at least one optical element of the first optical assembly is different than the corresponding one of the at least one optical element of the second optical assembly.

10. The method according to claim 1 further comprising
disconnecting the first optical assembly from the optical connector such that each one of the at least one cured bridge portions remains in contact with the terminal end of the respective one of at least one optical element of the second optical assembly;
providing a third optical assembly different from the first optical assembly having at least one optical element with a terminal end of each of the at least one optical elements terminating at an optical interface; and
positioning the optical connector to the third optical assembly along the optical interface such that the terminal end of each respective one of the at least one optical elements of the third optical assembly is contacted to a respective one of the at least one cured bridge portions such that one or more electromagnetic waves may be guided between the respective one of the at least one optical element of the second optical assembly and the corresponding respective one of at least one optical element of the third optical assembly.

11. The method according to claim 10, wherein each respective one of the at least one optical elements of the third optical assembly is selected from the group consisting of an optical fiber, a polymer waveguide, a lens, a transmitting module, a receiving module, and a transceiver.

12. The method according to claim 10, wherein at least one of the at least one optical element of the third assembly is different than the at least one optical element of the first optical assembly.

13. A first optical device comprising the prepared optical connector formed in accordance with the method of claim 1.

14. A second optical device comprising the prepared optical connector formed in accordance with the method of claim 10.

* * * * *